United States Patent
Pietrowicz (12)

(10) Patent No.: US 6,628,779 B1
(45) Date of Patent: Sep. 30, 2003

(54) METHOD AND SYSTEM FOR SCALEABLE NEAR-END SPEECH CANCELLATION FOR TIP AND RING TONE SIGNAL DETECTORS

(75) Inventor: Stanley Pietrowicz, Freehold, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/304,402

(22) Filed: May 3, 1999

Related U.S. Application Data

(60) Provisional application No. 60/085,000, filed on May 11, 1998.

(51) Int. Cl.[7] .................................................. H04M 1/58
(52) U.S. Cl. ......................... 379/404; 379/391; 379/372; 379/394; 379/398
(58) Field of Search ........................... 379/404; 370/285

(56) References Cited

U.S. PATENT DOCUMENTS

| | | | |
|---|---|---|---|
| 3,983,323 A | 9/1976 | Griffith et al. ................. | 178/58 |
| 4,283,604 A | 8/1981 | Chambers, Jr. ............... | 179/70 |
| 4,357,494 A | 11/1982 | Chambers, Jr. ............... | 179/16 |
| 4,375,015 A | 2/1983 | Chambers, Jr. ............... | 179/170 |
| 4,460,808 A | 7/1984 | Battista et al. ................. | 179/84 |
| 4,837,818 A | 6/1989 | Pieters et al. ................. | 379/252 |
| 4,856,059 A | 8/1989 | Halbig ........................ | 379/412 |
| 5,249,225 A * | 9/1993 | Williams ..................... | 379/404 |
| 5,263,084 A | 11/1993 | Chaput et al. ............... | 379/215 |
| 5,271,060 A * | 12/1993 | Moran et al. ................. | 379/404 |
| 5,343,520 A | 8/1994 | Willocx et al. .............. | 379/399 |
| 5,353,342 A | 10/1994 | Pietrowicz ................... | 379/257 |
| 5,398,282 A * | 3/1995 | Forrester et al. ............. | 379/391 |
| 5,400,394 A | 3/1995 | Raman et al. ................. | 379/88 |
| 5,438,618 A | 8/1995 | Jantzi et al. ................. | 379/387 |
| 5,519,774 A | 5/1996 | Battista et al. ............... | 379/386 |
| 5,796,810 A * | 8/1998 | Lim et al. ............... | 379/142.02 |

OTHER PUBLICATIONS

"Testing Guidelines for Analog Type 1, 2, and 3 CPE as Described in SR–INS–002726", Bellcore, Special Report, SR–300 Issue 2, Jan. 1995.

"LSSGR: Voiceband Data Transmission Interface Section 6.6", Generic Requirements, GR–30–CORE, Issue 1, Dec. 1994.

(List continued on next page.)

*Primary Examiner*—Forester W. Isen
*Assistant Examiner*—Daniel Swerdlow
(74) *Attorney, Agent, or Firm*—Joseph Giordano; Glen Farbanish

(57) ABSTRACT

A method and system for providing suppression of near-end speech energy for tone signal detectors. In accordance with the invention a system or device is connected between the tip and ring on a subscriber loop, the subscriber loop being connected to office equipment and that subscriber's station set. The system also includes a receive interface that is connected to either a tone signal detector or a frequency shift keying modulator. The system achieves speech cancellation by forming a Wheatstone bridge with a mirror circuit possessing a scaled image of the loop and office equipment impedance. In one embodiment of the invention the Wheatstone bridge is formed using the combined impedance of the loop and office equipment as the impedance that is to be matched by a set of balanced networks included within the system. In accordance with this aspect of the invention the Wheatstone bridge uses a parallel circuit with common end nodes containing two known resistances of equal value that are singularly connected to the unknown impedance and the matched impedance, respectively. Voltage division occurs across each circuit. When the unknown impedance is perfectly matched the voltage and signal phase in each circuit is the same. In another embodiment of the invention the resistances are replaced by using an active component. Specifically, a transistor pair is configured as mirrored current sources.

36 Claims, 9 Drawing Sheets

OTHER PUBLICATIONS

"Customer Premises Equipment Compatibility Considerations for the Voiceband Data Transmission Interface," Special Report, SR–TSV–002476, Issue 1, Dec. 1992.

SR–TSV–002476, entitled "Customer Premises Equipment Compatibility Considerations for the Voiceband Data Transmission Interface", Issue 1, Dec. 1992.

SR–3004, entitled "Testing Guidelines for Analog Type 1, 2, and 3 CPE Described in SR–INS–002726", Jan. 1995.

GR–30–CORE, entitled "Voiceband Data Transmission Interface", Issue 1, Dec. 1994.

Application No. 08/540,532, filed Oct. 10, 1995, entitled "Apparatus For Dialing Of Called ID Block Code and Receiving Call Waiting Caller–ID–Signal", Lim, et al.

* cited by examiner

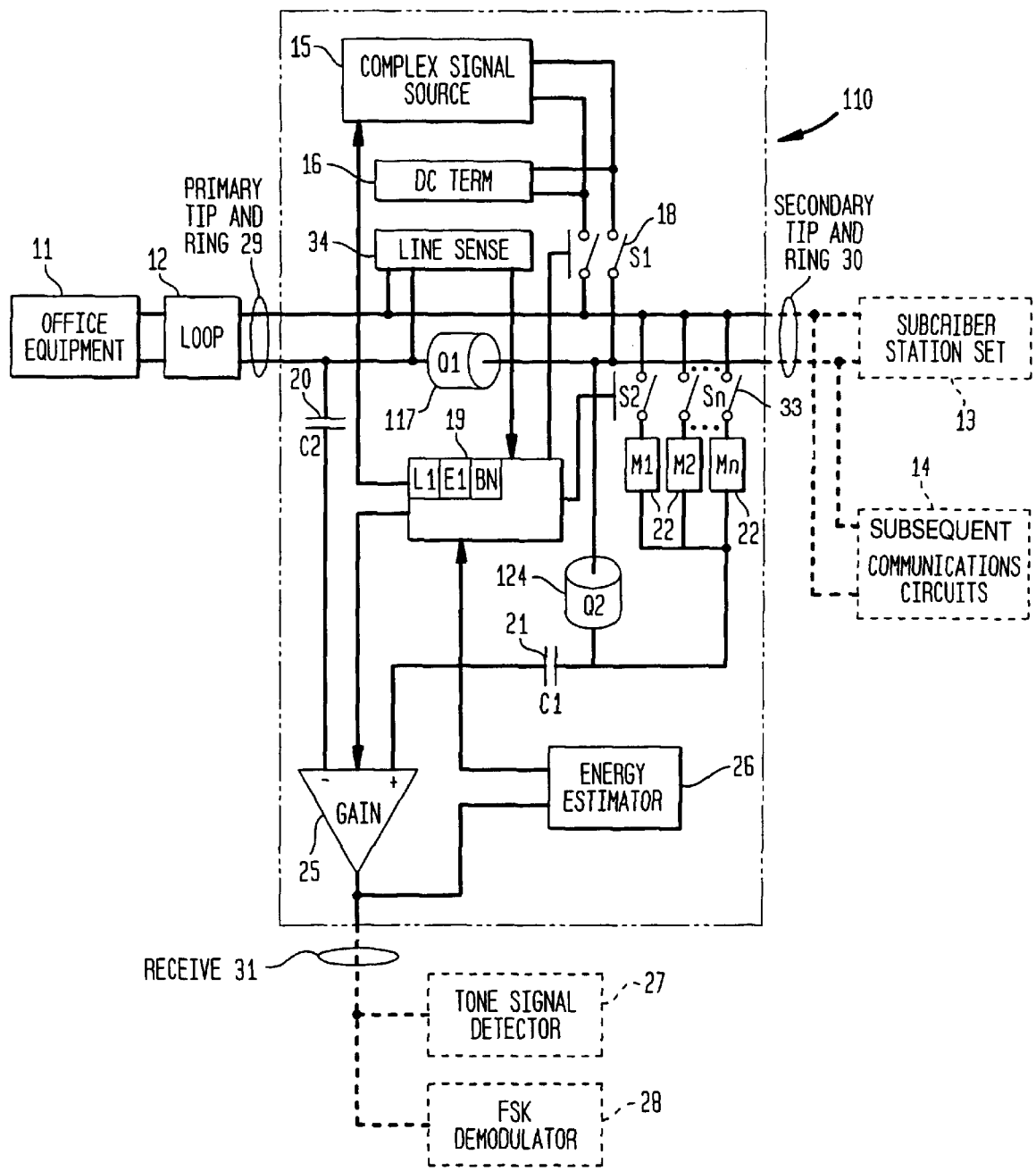

METHOD AND SYSTEM FOR SCALEABLE NEAR-END SPEECH CANCELLATION FOR TIP AND RING TONE SIGNAL DETECTORS

RELATED APPLICATIONS

This application claims the benefit of U.S. Provisional Application No. 60/085,000 filed on May 11, 1998 and entitled "A Method and System for Scaleable Near-End Speech Cancellation for Tip and Ring Tone Signal Detectors".

FIELD OF THE INVENTION

The present invention relates to methods and systems that provide suppression of near-end speech energy for applications including, but not limited to, improving the talkoff and talkdown performance of inband signal tone detection systems. In particular, the present invention describes a method and system providing interconnection between the tip and ring telephone line interface and subsequent communications equipment for the purposes of calibrating a selectable line bridging circuit and extracting a single, unidirectional path containing predominantly far end energy, wherein, near-end speech signals have been canceled. The method and system inherently provide access to on-hook service signals, such as calling party identification data transmissions.

BACKGROUND OF THE INVENTION

Echo cancellation systems are widely used in the telephone network and in station set equipment. The traditional role of echo cancellation systems in the telephone network has been to improve the quality of a transmission channel by removing unwanted signal reflections that occur at points of impedance mismatch in the communication circuit. Echo cancellers have also been employed in station set equipment, for the most part, to enable high speed, full duplex data transmission. With the introduction of new telephone services aimed at the analog residential subscriber, echo cancellers or near-end speech cancellation systems have recently become of significant importance in subscriber station sets to improve the performance of inband tone signal detectors.

Inband tone signaling schemes using combinations of discrete frequencies have long been used in the telephone system. The primary advantage of inband tone signaling is that the same spectrum that normally carries customer speech can be used to alternately transmit signal and control information. Sharing the voiceband is essential in situations where bandwidth is limited and dedicated control channels are either too costly or pose a degradation to service. Some of the most common examples of inband tone signaling used in the telephone network today include call progress signals, such as dial tone, stutter dial tone, audible ringing, busy, reorder, call waiting, etc., and Dual Tone Multi-Frequency (DTMF) signals used predominantly for dialing.

In recent years, new telephone services, such as Calling Identity Delivery on Call Waiting (CIDCW), Call Waiting Deluxe (CWD) and advanced screen telephony platforms, such as the Analog Display Services Interface (ADSI) and the Internet or Web Phone, have been deployed and require reliable Customer Premises Equipment (CPE) tone signal detection for signals sent by a Stored Program Control Switching System (SPCSS) or a far-end server. These services and platforms, encouraged by many technological advances in semiconductors, are transforming the conventional telephone set into a sophisticated, integrated communications terminal bearing a liquid crystal display and keyboard that under microprocessor, if not digital signal processor, control can track the state of a call and react to network and far-end tone signals.

All inband tone signaling systems are premised on the belief that a tone signal can be reliably detected. For Analog Display Services Interface (ADSI) Customer Premises Equipment (CPE), reliable detection of network call progress signals is necessary for the CPE to properly track the state of the call and generate internal events that are to be processed by a downloadable service script resident in the CPE. For CIDCW and CWD CPEs, reliable detection of the CPE Alerting Signal (CAS) is necessary to engage the CPE's off-hook data transmission mode for the reception of a data burst containing the calling party's number, name, location or personal identification number. For telephone answering machines and voicemail systems, reliable detection of DTMF signals is necessary to allow the subscriber to specify editing and control actions, even during playback of voice messages.

While reuse of an inband channel provides an efficient means for network-to-station set or server-to-station set signaling, significant problems related to signal recognition may be encountered by station sets attempting to detect tone signals.

Two traditional problems with inband tone signal detection are detector talkoff and talkdown.

Talkoff occurs whenever a tone signal detector erroneously accepts signal imitations produced by speech, music or noise as valid tone signals. Studies, experimentation, and field experience have all decisively confirmed that human speech can imitate some of the spectral and temporal properties of tone signals. The combination of consonants, vowels, syllables, and accent that frequently occur in an ordinary telephone conversation can cause a tone signal detector to talkoff. Ever since the first use of inband tone signaling in the telephone network, it has been a challenge designing reliable tone signal detection systems that are non-responsive to signal imitations.

Talkdown is another significant performance characteristic of tone signal detectors. Talkdown occurs whenever a tone signal detector fails to recognize a valid tone signal because it was masked or denied validation as a tone signal because of extraneous energy present on the line. In some instances, tone signals may compete with speech, music and other background noise. The presence of these complex signals distorts valid tone signals and can impair their detection.

Talkoff and talkdown are two critical performance measures for a tone signal detector. They respectively describe the detector's ability to resist signal imitations and to recognize valid tone signals obscured by speech, music or noise. Although tone signal detection has been a prevalent art in the telephone network for decades, only recently has the need for robust talkoff and talkdown performance been simultaneously required in an application. For the most part, prior art tone signaling applications, such as DTMF dialing, have benefited from environments where detector talkdown performance could be sacrificed in favor of improving talkoff performance. With the advent of CIDCW, CWD and ADSI, simultaneous robust talkoff and talkdown performance became a necessity.

Bellcore has specified CPE or station set criteria in Bellcore documents SR-TSV-002476, entitled "*Customer Premises Equipment Compatibility Considerations for the*

*Voiceband Data Transmission Interface*", Issue 1, December 1992, and SR-3004, entitled "*Testing Guidelines for Analog Type 1, 2, and 3 CPE Described in SR-INS-002726*", January 1995, that address the talkoff and talkdown performance of tone signal detectors for the CAS and call progress signals. The recommendations contained in these documents call for highly reliable tone signal detection. For example, SR-TSV-002476 recommends that a CAS detector respond to no more than 1 signal imitation in 45 hours of exposure to equal amounts of average level near-end and far-end telephone speech. The talkdown criteria that must be simultaneously achieved by this CAS tone signal detector for the average near-end talker on an average loop are the recognition of 99% of all valid CAS. The combination of these performance criteria makes CAS tone signal detectors that are compliant with SR-TSV-002476 arguably the most robust inband tone signal detectors ever deployed in the telephone network.

For tone signal detection systems used at a subscriber's location, signal imitations can come from both the near-end subscriber's voice as well as the voice of a far-end party. The near-end subscriber's voice is usually the dominant source of talkoff because the electrical speech level of the near-end subscriber is significantly stronger than that of the far-end. The speech signal of the far-end party is reduced by the loss on two loops, i.e., the far-end party's loop and the near-end subscriber's loop, and any intervening network loss before it appears at the near-end subscriber's station set. The near-end subscriber is also the dominant cause of talkdown since signals like the CAS and call progress signals are typically transmitted from the central office SPCSS while the far-end party is either muted or not yet connected.

It is characteristic of tone signal detectors to employ the concept of guard action to resist tone signal imitations and gain a degree of immunity to talkoff. Such detectors validate a tone signal only if a certain signal-to-guard ratio is satisfied for each tone signal frequency component. The signal-to-guard ratio is the ratio of the power present within a tone signal frequency band to the power present in one or several designated guard bands. The guard band is a portion of the voiceband that the tone signal detector uses to extract information about the purity of the tone signal. A single guard band can be selected for all the tone signal frequency components or a combination of several guard bands may be used.

Detectors using the guard principle usually require a large positive signal-to-guard ratio to validate incoming tone signals to minimize talkoff. A large signal-to-guard ratio demands that the energy within the signaling frequency band be relatively pure with respect to the energy in the guard band(s). Since speech is likely to produce significant energy at frequencies outside the signaling bands, this condition rejects many potential energy patterns that might talkoff a detector and, hence, improves tone signal detector talkoff performance.

Although this strategy may provide good talkoff performance, talkdown performance is likely to suffer unless speech, music or noise that can mix with a tone signal is successfully attenuated or canceled. Two basic approaches have been employed by the majority of new CIDCW, CWD, and ADSI CPE to provide satisfactory tone signal detector performance. The simplest approach has been the direct, parallel connection of the tone signal detector to tip and ring interface. Better arrangements have placed the tone signal detector behind a speech path separation device that inherently attenuates the level of near-end speech. More complex arrangements have utilized analog and digital cancellation techniques. A closer examination of several existing prior art implementations that fall within these two categories reveals their advantages, disadvantages, and the benefits of the present invention.

Method 1

In the simplest approach, the tone signal detector is bridged directly across the tip and ring interface of the station set as illustrated in FIG. 1. This arrangement is advantageous primarily because of its minimal line interconnection complexity. The tone signal detector passively listens across the line. Its high impedance and parallel line.connection mean that it does not interfere with other station sets on the same line or communication equipment beyond its point of presence. It further provides access to on-hook-service signals, such as Calling Identity Delivery (CID). Its interconnection method is also very amenable to adjunct communication devices that do not incorporate any type of line termination circuit that may normally be used in an integrated telephone.

The primary disadvantage of the bridged tip and ring arrangement is that it presents the worst case tone signal detection environment. The tone signal detector in this arrangement is exposed to the full power of near-end speech. This creates significant difficulties for achieving robust talkoff and talkdown performance. A survey of speech levels, adjusted and converted to obtain levels at the station set, indicates that near-end telephone speech has a mean Active Speech Level (ASL) of −19 dBm with a Gaussian distribution and standard deviation of approximately 4 dB. Using the three sigma case as the upper limit, near-end speech levels at the subscriber's tip and ring interface can reach levels as high as −7 dBm ASL. Experimentation and experience have decisively shown that the talkoff and talkdown performance of a tone signal detector rapidly degrades as the level of speech increases. The rate of talkoff, or number of talkoffs per hour, tends to rise exponentially with increasing speech level. Speech levels at −7 dBm ASL are extremely loud and usually pose a substantial threat for talkoff and talkdown. Although possessing low interconnection complexity, the bridged tip and ring arrangement offers no benefit in reducing the level of near-end speech.

Near-end speech poses a even greater threat for CAS tone signal detectors. Not only are near-end speech levels loud, but the threat of talkoff is further enhanced because near-end speech is likely to be pre-emphasized by the subscriber's telephone handset. Historically, the transmitter response of the handset provides gain in the upper voiceband to counteract the effect of loop loss. Although most of the speech energy is in the lower part of the voiceband (<1000 Hz), psychological studies have determined that energy in the upper voiceband is necessary and critical to maintain the intelligibility of speech. As a result, telephone transmitters have been historically designed to supply an energy boost in the upper voiceband. A survey of commercially available telephone equipment indicates that an average transmitter characteristic can be approximated by a straight line with positive slope from 300 Hz to 3000 Hz over a log-frequency scale, with a response at 300 Hz down 5 dB relative to 1000 Hz and a response at 3000 Hz 5 dB higher relative to 1000 Hz. Since CAS frequencies, 2130 and 2750 Hz, are in the upper voiceband, transmitter pre-emphasis will place more speech energy in the signaling bands and create even more potential for talkoff that is not mitigated by the bridged tip and ring arrangement.

Tone signal detector talkdown is also a problem for the bridged tip and ring arrangement because near-end speech energy will often overwhelm the tone signal energy. In the case of CIDCW, for instance, the CAS is typically sent from the SPCSS at −15 dBm per tone. Attenuation due to the loop response can introduce up to 15 dB of loss in the 99 percentile case. Since near-end speech can combine with CAS, tip and ring CAS tone signal detectors will be exposed to a worst-case signal-to-speech ratio of −23 dB (−15−(−7) dB). Reliable detection of tone signals with such a poor signal-to-noise ratio is difficult, even for liberal detectors that make little attempt to reject signal imitations. With a tone signal detector employing the aforementioned guard principle, the- signal-to-guard ratio qualification criteria would not be met in many instances of legitimate tone signals because near-end speech energy would significantly corrupt the signal.

As taught in Battista, et. al., U.S. Pat. No. 5,519,774 entitled, "Method and System for Detecting at a Selected Station an Alerting Signal in the Presence of Speech" tone signal detectors can be designed to provide good talkoff and talkdown performance for bridged tip and ring applications. However, the meticulous adjustment of detection parameters that is necessary to achieve the proper balance of talkoff and talkdown performance in these designs is a difficult and time consuming process. Furthermore, there is no guarantee that the final detector design will be conducive to a specific manufacturing process.

In summary, the bridged tip and ring tone signal detector arrangement is a simple, non-intrusive method to access service signals, such as inband tone signals and on-hook CID data transmission signals. However, from the standpoint of tone signal detection, it is the most difficult arrangement to achieve good talkoff and talkdown performance because it does nothing to reduce the level of near-end speech incident upon a tone signal detector. The prior art has already established that tip and ring tone signal detectors with good talkoff and talkdown performance, while achievable, are extremely difficult to design and build.

Method 2

A second common arrangement employed in conjunction with tone signal detectors that provides improved talkoff and talkdown performance without modifications to a tone signal detector's algorithm is illustrated in FIG. 2. In this system, the tone signal detector is located behind a device typically referred to as a hybrid.

The hybrid is a device that converts the bi-directional path on the tip and ring interface into two separate unidirectional paths for transmit and receive. Far-end and network signals on the tip and ring interface appear on the receive path where the tone signal detector is connected. Near-end signals are ideally transferred from the transmit path behind the hybrid to the tip and ring interface.

In practice, some leakage of near-end speech energy will occur across the hybrid and appear at the input to the tone signal detector. The amount by which the near-end energy at a given frequency is attenuated by the hybrid is known as the transhybrid loss. The transhybrid loss is a function of how well the impedance of the balance network matches the impedance presented by the tip and ring interface.

The amount of transhybrid loss is critical to the performance of the tone signal detector in this arrangement because the transhybrid loss effects a reduction in the level of near-end speech incident upon the tone signal detector. Attenuation of the near-end speech level is useful because it dually reduces the probability of a talkoff occurrence and the probability that near-end speech will corrupt an incoming CAS. With a 6 dB transhybrid loss, for example, the level of near-end speech appearing at the tone signal detector input will be reduced from −7 to −13 dBm ASL and the signal-to-speech ratio will improve from −23 to −17 dB over the bridged tip and ring arrangement. Experimentation and experience have demonstrated that a reduction of 3 dB in near-end speech level or a similar improvement in signal-to-speech ratio dramatically improves the talkoff and talkdown performance of a tone signal detector similar to that described in Battista, et. al. Furthermore, a key design benefit of the hybrid arrangement is that it makes balancing the tradeoff between talkoff and talkdown performance less difficult because the dynamic swing of the tone signal detector, which is defined as the difference in dB between the worst case speech level and the worst case tone level, has been reduced.

Because transhybrid loss rapidly decreases as the match between the line impedance and the balance network diverges, a single network may not provide a suitable degree of transhybrid loss across the large majority of loop conditions. With a single balance network, for instance, the worst case transhybrid loss can range from 2 to 6 dB over the domain of all loop impedances in the U.S. network. To obtain further reduction in near-end speech level and improve the signal-to-speech ratio, the single balance network may be replaced by multiple, fixed networks or an adjustable network as illustrated in FIG. 3. This arrangement is sometimes referred to as an analog echo canceller.

Multiple balance networks or an adjustable balance network provide significant improvement in transhybrid loss over a signal network system. Transhybrid losses of greater than 15 dB could usually be achieved using at least three fixed networks. Because more than one balance network is available, the architecture must also include a mechanism (not shown) to select the optimal network for the loop condition encountered.

Although favorable from the standpoint of tone signal detector performance, arrangements like those illustrated in FIGS. 2 and 3 have certain disadvantages. First, traditional hybrid architectures are well suited for integrated telephone applications where separation of the speech path is inherently needed to provide the handset receiver and transmitter functions. For devices like telephone adjuncts, these systems are less practical. Adjunct devices are usually electrically connected in series with a station set and must therefore be capable of passing basic telephone line attributes such as DC voltage, line current, AC signals, and power ringing. To that extent, it is common practice to employ the bridged tip and ring solution previously described because the tip and ring interface physically passes through the adjunct unimpeded. To adapt a hybrid arrangement like those in FIGS. 2 and 3 for an adjunct, two hybrids must be placed back-to-back so that the two wire interface is regenerated for connection to a subscriber's telephone set. Additional circuitry is needed to either regenerate DC line voltage and power ringing or provide a means to route such signals around the back-to-back hybrids arrangement. This arrangement then becomes similar to a network repeater circuit where transmission characteristics of the repeater that affect the quality of the voice channel and factors like closed loop gain must be carefully engineered to avoid unstable device operation and provide a transparent line interface. For these reasons, the traditional hybrid solution useful in integrated telephone sets is not very practical for low cost adjuncts.

Another important consideration for the hybrid systems in FIGS. 2 and 3 is the provisioning of sidetone in integrated station sets. Traditionally, a certain amount of transhybrid leakage was intentionally designed into telephone sets to allow users to hear an attenuated version of their own speech. Psychologically, this provides the subscriber with the impression that the station set is operational. As a result, transhybrid losses were adjusted to provide no more than 6 dB of loss to satisfy the human factors requirements for sidetone. For tone signal detector performance and system design, this presents a disadvantage. In order to increase the transhybrid loss of the arrangements in FIGS. 2 and 3, a secondary circuit is needed to provide an alternate path for sidetone.

There is a third disadvantage to the arrangements in FIGS. 2 and 3, especially for integrated station set applications. There are instances when the functional elements of the station set may need access to the AC signals on the tip and ring interface even though the station set is in the on-hook condition. Two such identifiable instances include support for Multiple Extension Interworking (MEI) and on-hook services such as CID.

MEI is a signaling method and protocol for communication among CPEs on a subscriber's line that enables three functions: 1) the reception of CIDCW by all compatible CPE, regardless of their individual hook state; 2) the generation of customer line signals, such as Flash, to indicate selection of a call control action; and 3) the management of CAS acknowledgment signaling interactions among multiple CIDCW, CWD, and ADSI CPE. In order to perform the MEI protocol, a CPE must be able to detect a CAS while it is on-hook. With the hybrid systems depicted in FIGS. 2 and 3, the hybrid function is generally disconnected from the line interface by the hook switch function when the subscriber's set is in the on-hook condition. Consequently, the tone signal detector, being on the receive side of the hybrid, will lose access to the tone signals on the tip and ring interface. To overcome this limitation, even further additional circuitry is required to provide an alternate signal path to the tip and ring interface while the CPE is on-hook.

Another similar disadvantage that is readily identifiable in the arrangements depicted in FIGS. 2 and 3 is the difficulty of supporting on-hook services such as CID. On-hook CID services, like Calling Number Delivery (CND), Calling Name Delivery (CNAM) and Visual Message Waiting Indicator (VMWI), deliver data using the same Frequency Shift Keying (FSK) modulation technique as off-hook CIDCW and CWD services. The desire for modular CID functional elements that perform all the necessary procedures of both the on-hook and off-hook data transmission protocols in Bellcore's document GR-30-CORE, "*Voiceband Data Transmission Interface*" Issue 1, December 1994, has led to the fabrication of Application Specific Integrated Circuits (ASICs), herein referred to as CID ASICs. These devices combine the FSK demodulation and CAS tone signal detection functions onto a single device. For reasons that include providing universal applicability to adjuncts and integrated sets alike, minimizing complexity and device pin count reduction, a single device input on CID ASICs must be shared for both on-hook and off-hook CID services. With the hybrid arrangements illustrated in FIGS. 2 and 3, the reduction in circuit complexity offered by CID ASICs is partially offset by the need for external circuitry and control that provides multiple signal paths to access to the tip and ring interface depending upon the hook condition of the CPE. It is a highly desired feature for a CID ASIC to allow the device to be inserted into any design without impacting or requiring specific circuitry, or imposing performance criteria on other aspects of the system architecture.

Method 3

A third arrangement that also builds upon the systems depicted in FIGS. 2 and 3, yet provides significant improvements in the cancellation of near-end speech is shown in FIG. 4. In combination with a hybrid, a digital echo canceller can be employed to increase the transhybrid loss to 25 dB or more. The primary benefit of a digital echo canceller is that it practically eliminates any chance of near-end talkoff and talkdown because it highly attenuates the near-end speech echo.

In addition to those cited for the hybrid systems in FIGS. 2 and 3, the prime disadvantage of this speech cancellation system is the significant resources and interface circuitry required. Typical implementations of digital echo cancellers require an optimized microprocessor to perform the mathematical operations that remove the near-end echo, interface circuitry to digitize analog signals and memory code storage support. If the tone signal detector is implemented external to the echo canceller as illustrated in FIG. 4, an additional digital-to-analog converter is necessary. For these reasons, digital echo canceller implementations have not yet become practical for low cost adjunct and integrated telephones.

Method 4

A fourth arrangement that has been attempted to cancel near-end speech using a scaled Wheatstone bridge circuit is illustrated in FIG. 5. In U.S. Pat. No. 5,796,810, filed Oct. 10, 1995, issued Aug. 18, 1998, and entitled "*Apparatus For Dialing Of Called ID Block Code and Receiving Call Waiting Caller-ID-Signal*", Lim, et. al., disclose a Wheatstone bridge circuit as illustrated in FIG. 5. This arrangement employs the Wheatstone bridge principle where if the balance network identically matches the impedance of the loop and fixed resistors $R_a$ and $R_b$ are identical, the near-end speech signals arriving at the input to the differential amplifier G from the two circuit legs will be identical in magnitude and phase. The differential amplifier will subtract these signals from each other and produce a resultant signal that is input to the tone signal detector containing the residual energy of the near-end speech cancellation process. In practice, resistance $R_b$ is scaled to a factor C greater than resistance $R_a$ to reduce loading effects on the tip and ring interface. Likewise, the single balance network impedance is scaled by the same factor.

Although this arrangement cancels near-end speech and provides access to the tip and ring interface regardless of station set hook state, it performs poorly in practice over the domain of loop impedances. The reason for its poor performance is two-fold. First, the fixed impedances $R_a$ and $R_b$ are subject to component tolerances and consequently are never identically matched. This results in an imbalance in the bridge that is amplified by the differential amplifier. Second, the single, fixed balance network employed in the circuit provides a poor match over the domain of possible loop impedances. Experimentation has demonstrated that the worst case near-end speech cancellation performance of the Wheatstone bridge arrangement in FIG. 5 is about 1 to 2 dB. Because of its inadequate performance, the Wheatstone bridge arrangement has often been ignored.

The review of the prior art has established that talkoff and talkdown performance of a tone signal detector can be significantly improved by attenuating the level of incident near-end speech. It has further established that most prior art near-end speech cancellation techniques require system architectures that remove the tone signal detector from the tip and ring interface and place it at a location that does not generally have access to line signals when the station set is on-hook without additional signal paths. One prior art cancellation method does provide access to tip and ring regardless of hook-state; however, its cancellation performance is poor.

SUMMARY OF THE INVENTION

In view of the foregoing, it is an object of the present invention to provide a method and system to cancel near-end speech energy for tone signal detectors that connect to the tip and ring interface using an improved Wheatstone bridge technique that also provides access to on-hook service signals regardless of the hook state of subsequent communications equipment. The method and system operate independently of other telephony functions and can be applied in standalone adjunct devices as well as integrated into a telephone set. The degree of near-end speech cancellation is controllable by scaling the system implementation to achieve the desired amount of near-end speech attenuation.

Specifically, the system uses a voltage or current sensing element placed in series with either the tip or ring interface lead. A scaled mirror impedance of both the sensing element and impedance presented by the tip and ring interface is then placed across the tip and ring interface to form a Wheatstone bridge. Rather than create two bidirectional paths, only a single receive path is differentially extracted from center of the bridge for input to a tone signal detector. Attenuation of near-end speech energy is controlled by the calibration and selection of the scaled mirror impedance values which are available from either a fixed set of R, L and C networks or an adjustable network. A controlling function uses one of several methods described to select the best network either at the time that the device is connected to the line, at the start of every telephone call or continuously adapting throughout the duration of a call.

BRIEF DESCRIPTION OF THE DRAWINGS

FIG. 7 is a block diagram of another illustrative embodiment of the near-end speech cancellation system of the present invention using a current sense implementation;

DETAILED DESCRIPTION

Analog System

Figure 1:
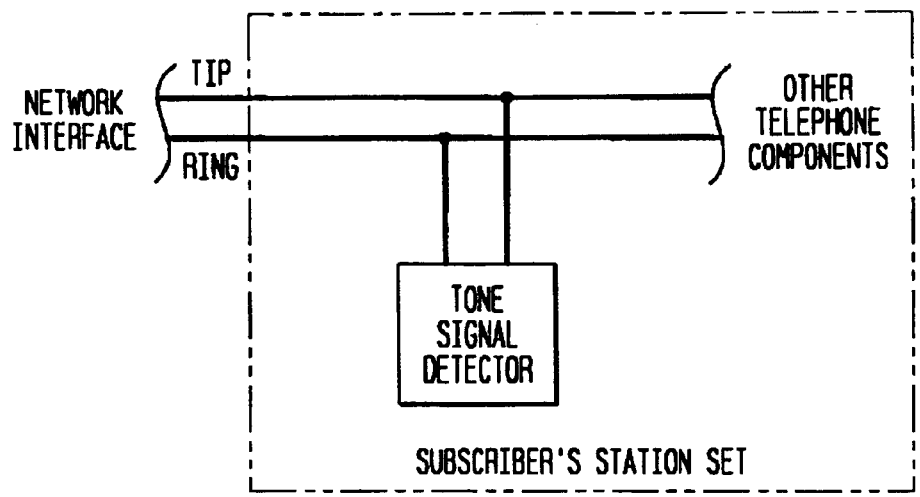
FIG. 1 is a block diagram of a prior art tip and ring tone signal detector connection method.
Figure 2:
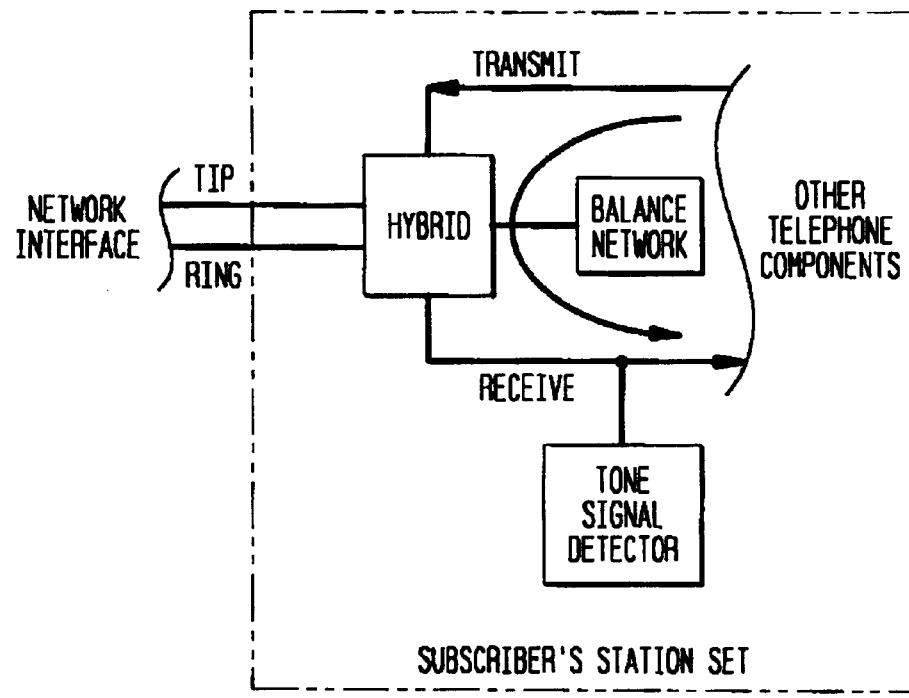
FIG. 2 is a block diagram of a traditional prior art telephone hybrid used to attenuate near-end speech for the benefit of tone signal detection.
Figure 3:
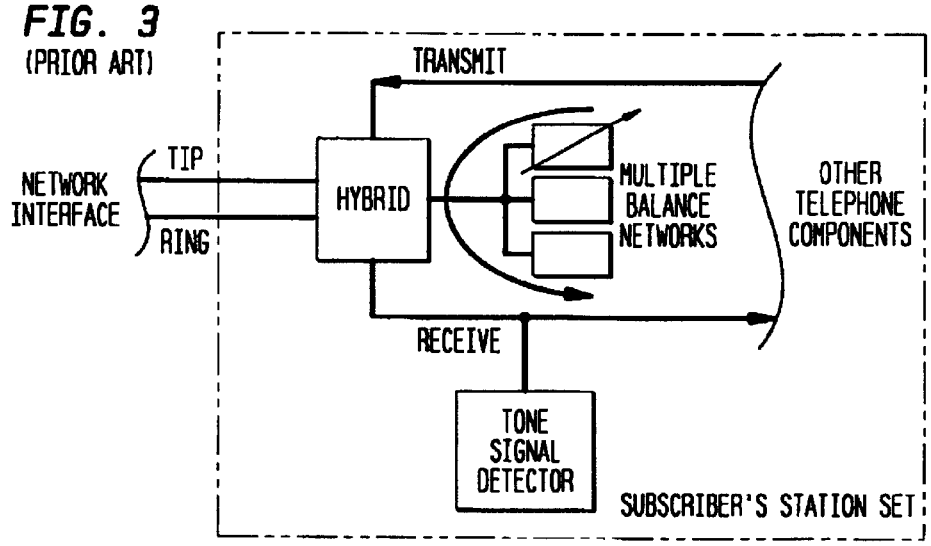
FIG. 3 is a block diagram of a traditional prior art telephone hybrid employing multiple balance networks and/or an adjustable network to attenuate near-end speech for the benefit of tone signal detection.
Figure 4:
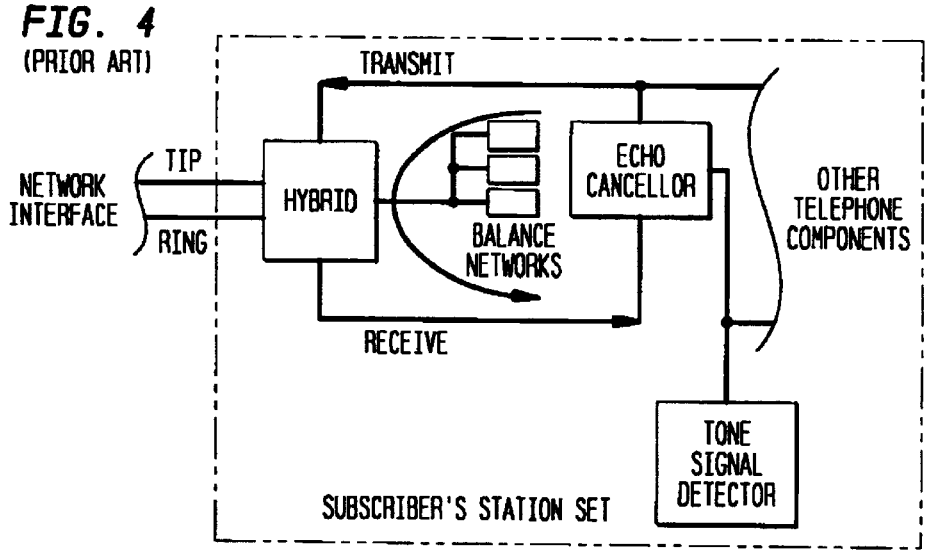
FIG. 4 is a block diagram of a traditional prior art telephone hybrid used in conjunction with a digital echo cancellation device to attenuate near-end speech for the benefit of tone signal detection.
Figure 5:
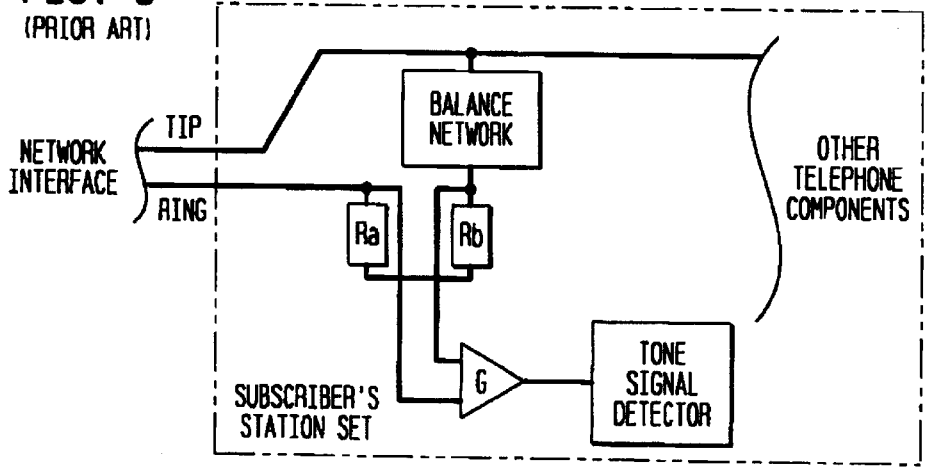
FIG. 5 is a block diagram of a prior art fixed Wheatstone bridge arrangement that attenuates near-end speech for the benefit of tone signal detection.
Figure 6:
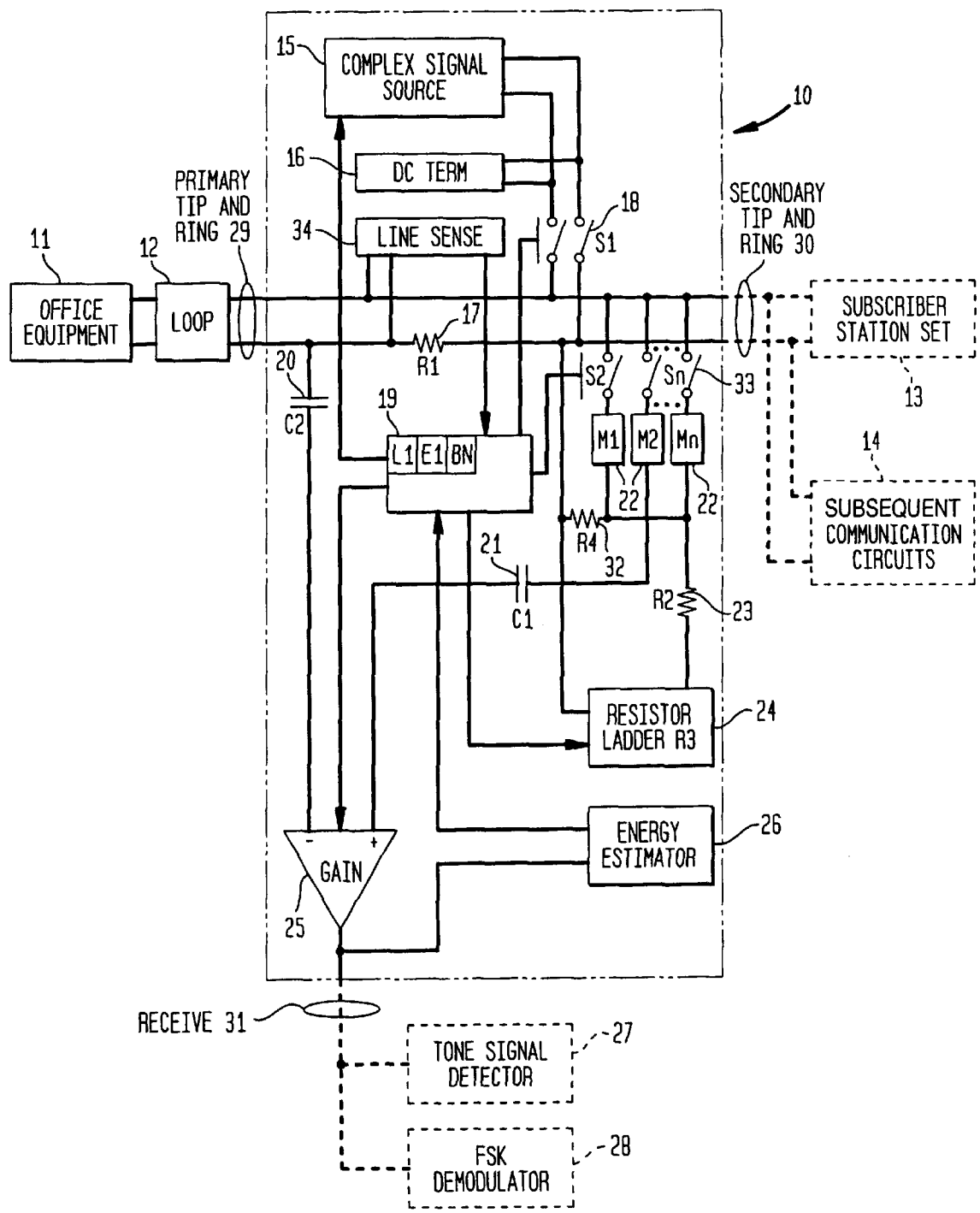
FIG. 6 is a block diagram of an illustrative embodiment of the near-end speech cancellation system of the present invention using a voltage sense implementation.

A generalized block diagram of an analog near-end speech cancellation system 10 for a tip and ring tone signal detector using a voltage sense implementation in accordance with an aspect of my invention is shown in FIG. 6. A similar block diagram of the near-end speech cancellation system 110 using a current sense implementation in accordance with another aspect of my invention is shown is FIG. 7. Differences in the operation of these implementations will be noted as necessary below.

Turning now to FIG. 6, there is shown the system 10 with three points of interconnection: a primary tip and ring interface 29, a secondary tip and ring interface 30, and a receive interface, 31. Through the primary tip and ring interface 29, the system 10 connects to a telephone loop 12, which, in turn, interconnects the system 10 to a central office or remote terminal communications equipment 11. The secondary tip and ring interface 30 is shown connecting to either a subscriber station set 13 or subsequent communication circuits 14 depending upon the application. For an adjunct device, the system 10 would be incorporated into the adjunct and the secondary tip and ring interface 30 would interconnect an external subscriber station 13 set as shown. For an integrated telephone set, the system 10 would become a front end circuit that interconnects the primary tip and ring interface 29 to subsequent communications circuits 14 within the telephone set. The receive interface 31 provides a signal path to a tone signal detector 27 or FSK demodulator 28 as shown. This path predominantly contains only the signal energy transmitted by the office equipment 11 to the system through the primary tip and ring interface 29. A small residual cancellation energy of the near-end speech signal transmitted by the subscriber station set 13 or communications circuit 14 may appear on the receive interface 31.

The object of the near-end speech cancellation system 10 for tip and ring tone signal detectors is to highly attenuate near-end speech signals to reduce the probability of talkoff and improve the signal-to-speech ratio, thereby improving the tone signal detector's signal recognition performance. In accordance with this aspect of my invention near-end speech cancellation is achieved in this system by forming a Wheatstone bridge using the combined impedance of the loop 12 and office equipment 11 as the impedance that is to be matched by a network from the set M1, M2 through Mn 22. The Wheatstone bridge uses a parallel circuit with common end nodes containing two known resistances of equal value that are singularly connected to the unknown impedance and the matched impedance, respectively. Voltage division will occur across each circuit. The center taps will contain the same voltage and signal phase when the unknown impedance is perfectly matched by the matching impedance.

In the voltage sense implementation in FIG. 6, a known resistance R1 17 is placed in series with either lead of the primary tip and ring interface 29. The value of R1 17 is chosen to be small (1 to 15 ohms) to avoid an excessive DC voltage drop resulting from the draw of telephone line current. Line currents typically range from 18 to 120 mA. Instead of using an impedance identical to R1 17 in the mirror circuit of the bridge, an impedance significantly larger by a factor of K is chosen. The larger impedance is necessary to prevent excessive loading of the telephone line by the mirror circuit of the bridge. Generally, values of K in the range of 50 to 1000 are practical. In FIG. 6, the mirror image of impedance R1 17 is shown as the parallel-series combination of impedances R2 23, R3 24 and R4 32. The combined impedance of these elements is set to match impedance R1 17 multiplied by a factor of K.

The matching of impedance R1 17 and its scaled mirror image is critical to the circuit's cancellation performance. Although it is possible to simply use fixed resistances for both R1 17 and its image that differ by a factor of K, parts tolerances may lead to unacceptable impedance mismatches depending upon the desired degree of cancellation performance sought. Rather than require the need for expensive, small tolerance components, the preferred implementation in FIG. 6 uses a fixed impedance slightly greater than sensing impedance R1 17 in parallel with an adjustable impedance consisting of fixed impedance R2 23 and a switchable impedance ladder R3 24. The purpose of the parallel combination of impedances is to permit the mirror image of R1 17 to be adjustable in fine steps. Since the effective resistance of resistances in parallel is smaller than that of the smallest parallel resistance, impedance R4 32 is set to R1*(K+Y), where factor Y is in the range from 1 to 10. Fine tuning of the mirror image impedance is achieved by closing and opening switches in the resistance ladder R3 24. A fixed impedance R2 23 has been placed in series with the resistance ladder to permit smaller, more practical resistance elements to be used in the resistor ladder. Fixed impedance R2 23 simply offsets the combined parallel resistance offered by itself and the resistance ladder. The combined impedance of fixed impedance R2 23 and the resistance ladder R3 24 should equal R1*K*(K+Y)/Y at a maximum. Although the resistance ladder can be implemented in various ways, a digitally controllable resistance where the resistance value is controlled by a binary data word is preferred as shown in FIG. 6. The value of the binary data word is determined by a system controller 19 according to a method later described.

Assuming that the ratio of impedance R1 17 to its mirror impedance is equal to 1/K, completion of the bridge requires that a scaled impedance on the mirror circuit be selected to match the combined impedance of loop 12 and the office equipment 11. The scaling factor for the matching mirror impedance is also required to be factor K. The set of balance networks shown as M1, and M2 through Mn 22 represent fixed or variable impedances consisting of one or more circuit configurations, such as series, parallel, series-parallel, etc, containing resistive, capacitive and inductive elements. Values for these elements and the number of networks in the set are chosen to obtain a scaled mirror impedance that can best match the domain of impedances that can be encountered on the primary tip and ring interface 29 and that can meet a worst case near-end cancellation objective. Depending upon the balance network configuration, resistive and inductive elements are generally K times as large as the impedance presented by the primary tip and ring interface 29. Capacitive elements are K times smaller. Experimentation and experience have demonstrated that a single network may provide only 6 dB of cancellation under some loop conditions, while two judiciously chosen networks could provide up to 12 dB. Additional networks would likewise improve the worst case degree of cancellation across the domain of loop and office equipment impedances.

Although in FIG. 6I illustratively depict switches S2 through Sn 33 as connecting the balance networks to the secondary tip and ring interface, alternate implementations exist that position switches S2 through Sn 30 at locations where they could be better protected from metallic line surges. Metallic line surges are high voltage spikes generated by events such as lightning. Customer Premises Equipment designed for the telephone network must be able to survive the metallic line surges described by FCC Part 68. For example, switches S2 through Sn 33 could be moved to a location at either the input or output of the differential amplifier 25. In both cases, the balance networks M1 through Mn would remain permanently connected to the Tip and Ring interface. Each balance network would require its own matching mirror sense impedance 23, 24 and 32 and independent calibration as discussed later. If positioned at the input to the differential amplifier 25, switches S2 through Sn 33 would be used to select a signal derived from one of the mirror circuits formed by a balance network and its mirror sense impedance 23, 24 and 32. Alternatively, each mirror circuit could be provided its own differential amplifier and switches S2 through Sn could be used to select the appropriate amplifier output to create the receive signal 31. These methods are practical when the number of balances networks, M1 through Mn, remains small, i.e., three or less, to prevent excessive loading of the tip and ring Interface.

The receive signal path 31 is obtained by differentially amplifying the signals at the center taps of the bridge. One input to differential amplifier 25 is connected through DC blocking capacitor C2 20 to the lead on the primary tip and ring interface 29 that contains the sensing element R1 17. Its other input is capacitively coupled through capacitor C1 21 to a common node between the balance networks M1 through Mn 22 and the mirror impedance of sense impedance R1 17. If the match between the combined impedance of the loop 12 and office equipment 11 and the selected balance network is sufficiently close, the voltage signals appearing at the input to the differential amplifier 25 will be almost identical in magnitude and phase. With a common mode rejection ratio of 60 dB or better, the differential amplifier will subtract the signals from each other and create a receive signal 31 where the near-end speech energy has been canceled.

At least one switch point in the set S2 through Sn 33 will remain closed while the subscriber station 13 or communications circuit 14 is on-hook to provide access to the tip and ring interface. This balance network may be chosen specifically for use in the on-hook condition to satisfy impedance and regulatory requirements. Switches S1 through Sn can be implemented using technology such as, but not limited to, transistors, electromechanical, solid state or photomos relays, field effect transistors or optocoupler devices.

Because the differential amplifier 25 remains connected to the primary tip and ring interface while on-hook, signals such as CID and VMWI FSK can be received. The gain of the differential amplifier 25 is set by the system controller 19 based upon its selection of the balance network. The gain is determined by the equation:

$$\text{Gain} = [R1(K+1) + Zb]/R1(K+1) \tag{1}$$

where $Zb = 1/jwC1 + Mn$ and Mn is the impedance of the selected balance network. The gain values for each network and each combination of networks that are to be used as a balance network are pre-computed and stored in the system controller memory. A network identifier Nn, where n is a whole number, is assigned to each gain value to indicate the network for which it applies. Each single network M1 through Mn and combination of networks shall possess a unique identifier.

The central procedural execution element of the system is the system controller 19. The system controller performs the functions of 1) monitoring the line voltage sense function 34; 2) applying the calibration source 15 and DC termination 16; 3) tuning the resistor ladder to best match the combined mirror impedance, consisting of R2 23, R3 24 and R4 32, to the sensing impedance R1 17; 4) monitoring the energy estimator 26; 5) selectively closing one or more switches in the set S2 through Sn 33 to attach one or more balance networks to the secondary tip and ring interface 30; 6) setting the gain of the differential amplifier 25 based on the selection of balance network; and 7) using feedback from the energy estimator 26 to decide which balance network results in the best cancellation of a calibration signal.

The method for selecting the best available balance network begins when the device containing the speech cancellation system is first connected to the telephone loop 12. In its simplest form, the line sense function 34 outputs a binary signal to the system controller indicating whether the line is idle or in-use based upon the line voltage at the primary tip and ring interface 29. Generally, the line can be considered idle if the voltage is above 23 volts and power ringing is not present. On the initial application of line voltage to the system during installation, following the restoration of line voltage after a service discontinuity or after some predetermined interval, the system controller 19, if the line is idle, proceeds to terminate the line using its DC line termination 16 through switch S1 18 to create an off-hook line condition. The system controller will then either 1) transmit a signal for calibration, 2) dial at least one DTMF digit using the complex signal source 15 to remove dial tone prior to transmission of the calibration signal, or 3) dial a maintenance number that will create a stable call state after which transmission of the calibration signal can begin. In all cases, the system controller should first sense the presence of dial tone on the primary tip and ring interface 29 or wait a predetermined period of time t1 until the application of dial tone can be assumed before dialing any digits or calibrating the cancellation circuit. Detection of dial tone energy can be performed using the energy estimator function 26 or an optional dial tone detector 27.

In the first instance, the calibration signal can begin after termination of the line; however, subsequent calibration procedures should be delayed until the application of dial tone or expiration of the predetermined interval t1. Typically, a dial tone delay time t1 of three seconds should cover the 99% percentile case in the U.S. network. The purpose of waiting for the application of dial tone is to assure that the office equipment 11 has properly terminated the loop 12. Because this option creates a stable call state for calibration, the performance of the cancellation system may perform better using this option since office equipment 11 used in the call initiation state may differ from the stable call state.

The complex signal source 15 can consist of a single or multiple tone generator, a flat or spectrally shaped noise generator or a DTMF generator. For use in an application involving the detection of call progress signals, a single calibration tone in the frequency range of 300 to 700 Hz is appropriate. For use in an application involving the detection of the CAS, single or dual tones at frequencies between 2100 and 2900 are suitable. DTMF signals, such as DTMF D or DTMF A in the preferred embodiment, are also suitable and practical since these signals are already available to complete the GR-30-CORE off-hook data transmission handshake in CIDCW/CWD and ADSI CPE. A complex noise signal is also sufficient for these applications and others.

Depending upon the method of application of the calibration signal as described above, the energy estimator 26 can either be responsive to dial tone or not. Generally, the energy estimator 26 should not be responsive to dial tone when the calibration signal is present to minimize error in the energy readings. If one or more digits are dialed prior to the calibration signal or the calibration causes the removal of dial tone, an energy estimator 26 that is responsive to dial tone can also serve to detect the presence of dial tone. The energy estimator 26 provides the system controller with an analog or digital output that is proportional to the energy level on the receive path 31.

After the calibration source 15 is applied or interval t1 expires, the system controller begins calibrating the combined impedance of R2 23, R3 24 and R4 32. Proceeding in a methodical fashion, the system controller 19 alters the impedance of R3 24 by opening and closing taps on the resistor ladder in an attempt to make the combined impedance R2 23, R3 24 and R4 32 closely match, if not exactly equal, a value of K times that of sense impedance R1 17.

In the preferred implementation, the system controller 19 starts the search by programming a digitally controllable resistance to either its lowest, highest or mid-range resistance value. It then proceeds to sequentially step up or down the ladder to search for the resistance value of R3 24 that provides the minimum receive 31 level. At each step, the controller reads the output of the energy estimator 26 and determines whether the new energy estimate is greater or less than the previous step.

If the new energy estimate is less, the system controller 19 updates its record of the previous resistance value and energy level held in buffer locations L1 and E1, respectively, with the new resistance value and energy level. In the preferred implementation, both the resistance value and energy estimate are binary words. The system controller 19 then continues changing the resistance value in the same direction of its previous path.

If the new energy estimate was greater than the previous level, the system controller 19 should not update buffer locations L1 and E1. Anticipating that noise may result in a spurious peaks in the energy estimates, the system controller 19 should continue to change the resistance value in the same direction. If, after several steps, the energy estimates are still greater than E1 and appear to be increasing, the resistance value should be reset to L1 to complete the calibration of R3 24. Otherwise, if the energy estimates are lower, the system controller 19 should continue searching for the minima by changing the resistance value in the same direction.

The one exception to this rule applies when the system controller 19 starts the initial resistance of the ladder 24 at a point other than its minimum or maximum, such as its mid-point value. In this case, upon obtaining several energy estimates that are greater than the value stored in buffer E1 immediately after the first step, the system controller 19 should reverse the direction of its path and begin again from its initial starting point. By starting at a mid-point value, convergence of the search may proceed quicker.

In any case where the energy estimate is indeterminately different from the previous reading E1, the system controller 19 should not update buffer locations L1 and E1 and should continue to step the resistance in the same direction until a determination can be made.

Once the calibration of resistance ladder R3 24 is complete, the selection process to choose the best balance network from the set M1 through Mn 22 to match the loop 12 and office equipment 11.impedance begins. In the case of a few fixed networks, the system controller 19 methodically proceeds to close the remaining switches in singular fashion from the set S2 through Sn 33. The closure of each switch attaches a balance network to the secondary tip and ring interface 30.

Prior to changing the switch settings, the system controller 19 selects and sets the differential amplifier gain to a predetermined value, e.g., the lowest, highest or mid-range gain value of the set of networks. Upon closure of a switch from the set S2 through Sn 33, the system controller reads the output of the energy estimator 26. If the energy estimate is less than the value stored in buffer E1, the system controller 19 updates a best_network buffer, BN, with the identity, Nn, of the current network attached to the line. Likewise, the system controller 19 updates buffer E1 with the new energy estimate. The system controller 19 then proceeds to remove the current network and attach another from the remaining subset of networks. The system controller 19 proceeds in this fashion until all networks have been tested. Upon testing the last network Mn, the BN buffer contains the identity of the individual network that minimizes the receive 31 level over the set M1 through Mn. Optionally, the system controller 19 can now attempt combinations of networks M1 through Mn to determine if a combination of networks produces a lower receive 31 level. All combinations of networks M1 through Mn 22 can be tested.

After determining the best single or combination of networks from the set M1 through Mn 22, the system controller 19 then opens all switches from S2 through Sn 33 and closes only those switches needed to produce the network identified by the contents of buffer BN. The complex signal source 15 and the DC termination 16 are removed by opening switch S1 18. The system controller 19 next retrieves a pre-computed gain value stored in its memory that is associated with the identifier of the selected balance network. The gain of the differential amplifier 25 is then set to this value, thereby completing the calibration procedure.

If at any time during the network selection process, an energy estimate either exceeds or underruns the scale of the energy estimator 26, the system controller 19 may elect to adjust the gain of the differential amplifier 25 by a discrete step, such as 6 dB, and repeat the selection procedure for all or part of the networks. The system controller 19 may also elect to increase the gain of the differential amplifier 25 to resolve which is the better network if two or more networks produce nearly the same energy estimate.

If the set of balance networks M1 through Mn 22, are implemented in whole or part by adjustable resistive, capacitive or inductive elements, the selection process can use a calibration procedure for each programmable element similar to that described for resistor ladder R3 24.

Upon the subscriber station 13 or communication circuit 14 going on-hook and entering the idle condition, the system controller can either leave the existing balance network connected to the secondary tip and ring interface 30 or it could resort back to a special network designed to satisfy on-hook impedance regulations. A change in balance network selection due to the idle CPE condition would also cause the gain of the differential amplifier 25 to be adjusted accordingly. The system controller 19 will sense an on-hook condition using the line sense function 34. A continuous on-hook duration of at least 1.55 seconds would need to be timed by the system controller 19 before actually considering the subscriber station set 13 or communications circuit 14 idle to prevent falsely interpreting DC signals such as Flash. When the subscriber station set 13 or communications circuit 14 subsequently proceeds to the off-hook condition, the system controller would change the balance network selection to that identified in the buffer BN and adjust the differential amplifier gain 25 accordingly.

Because the tip and ring near-end speech cancellation system allows multiple balance networks or an adjustable network to be used, the system's cancellation performance can be improved or scaled as necessary. Additional balance networks provide better coverage in terms of impedance match over the domain of the loop 12 and office equipment 11 impedances.

Figure 7A:
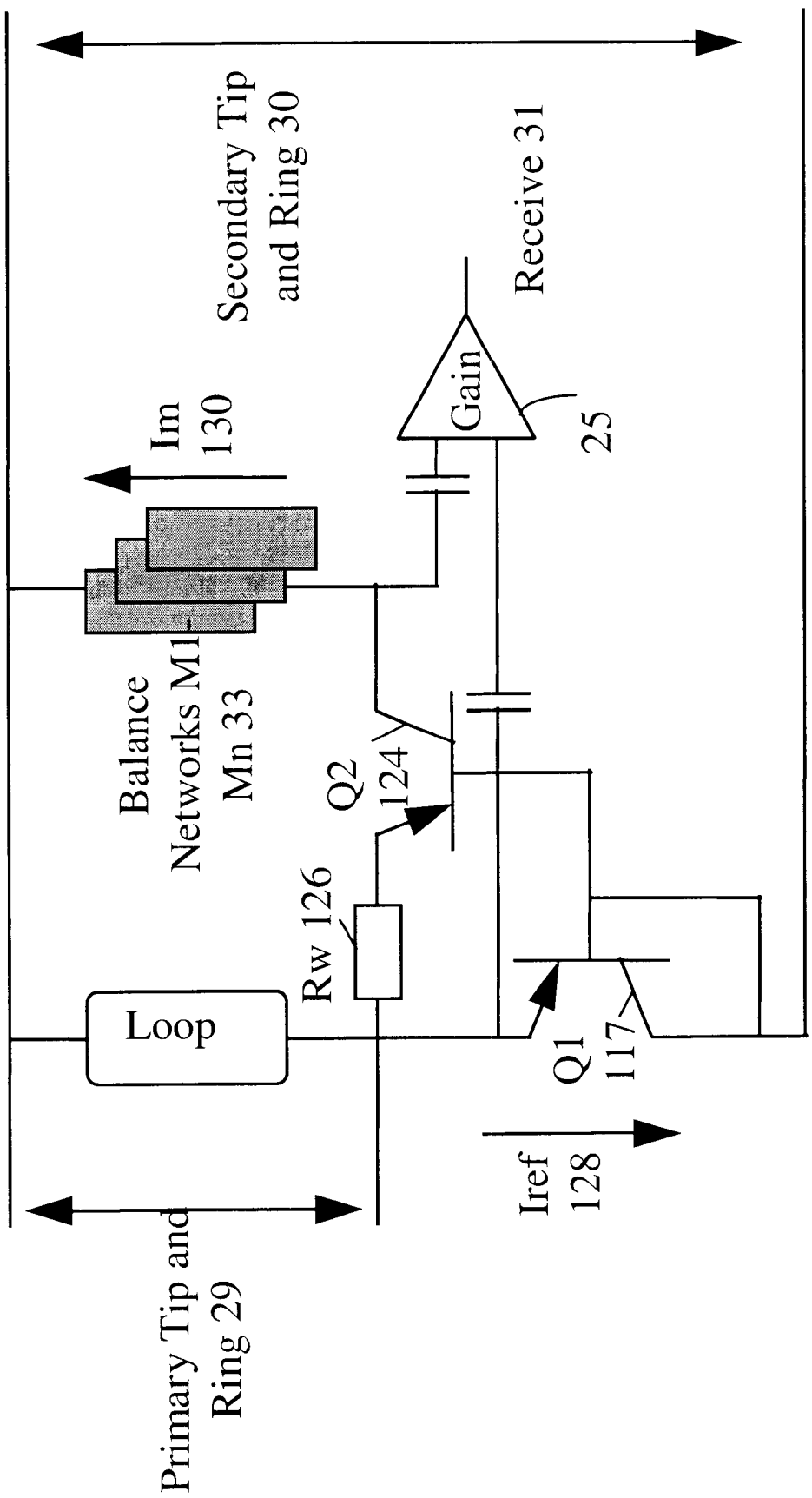
FIG. 7A shows an exemplary configuration of the current sense implementation of FIG. 7 using a transistor pair configured as mirrored current sources.

A block diagram of the near-end speech cancellation system 110 using a current sense implementation in accordance with another aspect of my invention is shown in FIG. 7. The operation of this system is similar to the voltage sense implementation in FIG. 6. The object remains to form a Wheatstone bridge with a mirror circuit possessing a scaled image of the loop and office equipment impedance. Rather than attempting to sense the line impedance using a passive element such as R1 17, the implementation in FIG. 7 uses an active component. Specifically, impedance R1 17 and the combination of impedances R2 23, R3 24 and R4 32 are replaced by a transistor pair configured as mirrored current sources Q1 117 and Q2 124. FIG. 7A shows a more detailed exemplary configuration of the mirrored current sources with transistor Q1 117 replacing impedance R1 17 and transistor Q2 124 and resistor Rw 126 replacing impedances R2 23, R3 24 and R4 32.

The current sense implementation of the near-end speech cancellation system 110 employs the characteristic of a transistor current source configuration whereby, due to the common voltage between the base and a common ground of each transistor in an identical pair, a reference current flowing through one transistor configured as a diode with its base connected to its collector will be mirrored by its counterpart in both magnitude and phase. Referring to FIG. 7A, the reference current Iref 128 passing through the subscriber station set on the secondary tip and ring interface would be mirrored by transistor Q2 124, thus creating a mirrored current Im 130 through the balance network. In a basic current source, the reference current Iref 128 would equal the mirrored current Im 130 if the emitter areas of the transistors were identical.

To prevent excessive loading on the primary tip and ring interface by the mirror circuit of the bridge, the balance network impedance value should be appropriately scaled up by a factor of K. Instead of scaling an impedance as per the voltage sense implementation, the current sense implementation scales the mirror current Im 130 down by a factor of K. When a match between the combined impedance of the loop and office equipment and a balance network from the set M1 through Mn 33 is achieved using the network selection procedure previously described, such that the impedance of the balance network is a factor of K greater, the transistor current source will create identical voltages at the center tap of the bridge.

Scaling the mirror current Im 130 to produce a factor of K difference between it and the reference current Iref 128 can be achieved in several ways. One possible method is to construct transistors Q2 124 and Q1 117 so that the ratio of their emitter areas is equal to a factor of K. Because values of K are likely to be in range of 100 to 1000, a more practical approach used in the preferred implementation is to replace the ordinary current source with a Widlar current source, also illustrated in FIG. 7A. By adjusting values of Rw 126, the relationship between Iref 128 and Im 130 can be set.

To illustrate how this configuration cancels near-end speech from the secondary tip and ring interface on the receive path, yet while providing access to signals from the primary tip and ring interface, assume that the combined impedance of the loop and office equipment is Rs and that the balance network has a matching impedance of K*Rs. Place a DC voltage source of Vdc and an AC voltage source of Vx*sin(wt) in series with the loop and office equipment resistance Rs. Further assume that the secondary tip and ring interface has an impedance of Rx.

Neglecting the diode drop of current source transistor Q1 117, the reference current Iref 128 is equal to (Vdc+Vx*sin(wt))/(Rs+Rx). The mirror current Im 130 is then (Vdc+Vx*sin(wt))/(K*(Rs+Rx)). The voltage across the balance network is therefore (Vdc+Vx*sin(wt))*Rs/(Rs+Rx). The voltage across the loop and office equipment is (Vdc+Vx*sin(wt))*Rx/(Rs+Rx). Summing these voltage using the differential amplifier 25 provides a receive path voltage of Vx*sin(wt)*(Rx−Rs)/(Rs+Rx). Thus signals on the primary tip and ring interface appear on the receive path.

Now assume that the secondary tip and ring interface has an AC voltage source of Vx*sin(wt) in series with its impedance Rx and that the AC source from the office equipment [if] is off, i.e., Vs=0. The reference current Iref 128 would be equal to (Vdc−Vx*sin(wt))/(Rs+Rx). The mirror current Im 130 would be equal to (Vdc−Vx*sin(wt))/(K*(Rs+Rx)). The voltage across thebalance network would be equal to (Vdc−Vx*sin(wt))*Rs/(Rs+Rx). The voltage across the loop and office equipment is (Vdc−Vx*sin(wt))*Rs/(Rs+Rx). Summing these voltage using the differential amplifier 25 provides a receive path voltage of zero. AC signals from the secondary tip and ring interface have effectively been canceled on the receive path.

There are at least three benefits of the current sense implementation over the voltage sense implementation. First, the voltage drop across the transistor current source is approximately fixed at 0.5 to 0.7 volts and it does not linearly increase as subscriber station set current draw increases. This reduces the increase in line voltage produced by the sense impedance and makes the system more transparent to the office equipment. Second, the current sense implementation is more conducive to an integrated circuit manufacturing process since high wattage resistances needed for impedance R1 17 are eliminated. Third, the current sense implementation eliminates the need for an adjustable resistor ladder R3 24 by using transistors with similar characteristics. Although a resistor ladder can be used to fine tune the mirror current Im 130 using a procedure similar to that previously described, it is probably not necessary because the voltages presented to the differential amplifier are less sensitive to the value of resistance Rw 126.

Those skilled in the art will note that FIG. 7 and the accompanying description are simply means for implementing my invention on an integrated circuit. Accordingly, there may be other arrangements of integrated circuit components capable of accomplishing the functions described by FIG. 6 and FIG. 7. Specifically, the transistors of FIG. 7 may be replaced by other combinations of transistors that provide, for example, a bipolar current source.

Digital Enhancement System

In the near-end speech cancellation system depicted in FIG. 6, cancellation of near-end speech is achieved by matching a scaled impedance to the impedance of the telephone line. Two signals are tapped from the center of the Wheatstone bridge and presented to the input of the differential amplifier 25. When the impedances are properly matched, each tapped signal contains near-end speech signals of equivalent amplitude and synchronous phase. The differential amplifier 25 subtracts the two tapped signals, thereby canceling the near-end speech components and producing a resultant receive signal 31 that contains only those signals incident upon the system 10 from the office equipment 11 and loop 12. This technique is analog in nature and is beneficial for inexpensive adjunct devices that need to connect to the telephone line with minimal interfacing circuitry.

The cancellation system presented in FIG. 6 teaches the use of a set of switching elements 22 that connect the mirror networks to complete the Wheatstone bridge. In some cases, it is desirable to eliminate the need for these switching elements or further improve the cancellation performance without adding additional networks. One alternative previously disclosed in this application is to permanently connect each network to the mirror sensing impedance 23, 24, and 32 and the primary tip and ring interface 29. In this configuration, the use of multiple balance networks creates multiple permanently connected mirror legs of the Wheatstone bridge where each balance network has it own mirror-sensing impedance 23, 14, and 32. However, the practical use of this configuration is limited to a small number of networks. The reason is that the presence of multiple permanently connected mirror networks lowers the on-hook impedance of the device. If too many networks are used, the on-hook impedance of the system 10 creates a condition that is undesirable for reliable dialing and reception of on-hook data, such as Caller ID.

Figure 8:
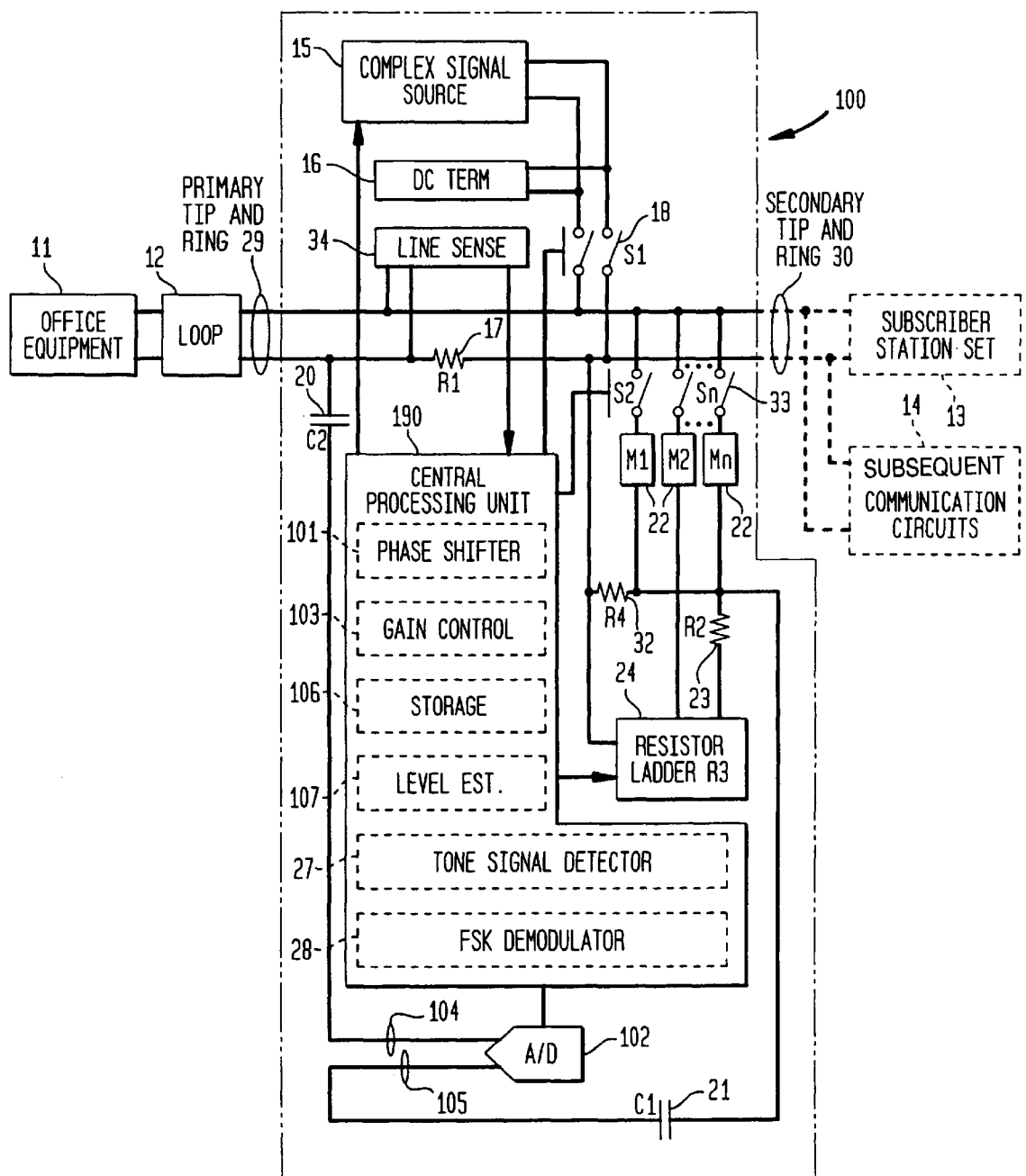
FIG. 8 illustratively depicts a digitally enhanced near end speech cancellation system.

To make the switching element 22 optional or further improve the near-end speech cancellation performance, a mathematical method can be implemented by a central processing unit using the configuration depicted in FIG. 8. FIG. 8 shows the switching element 22 present, but they can be replaced with a single or multiple permanent networks. The system 100, of FIG. 10, incorporates a central processing unit 190 capable of adding and multiplying digital words and including a phase shifter 101 and gain control 103. Unlike most echo cancellation systems, the unique attribute of this system 100 is that it requires only low processing capabilities. This allows simple microcontrollers, instead of digital signal processors, to perform the near-end speech cancellation. A further unique attribute of this system 100 is that it provides a digital cancellation capability that is convenient for devices, such as adjuncts, that need to connect to the telephone line with minimal interface circuitry. All of the previous benefits described for the near-end speech cancellation system 10 apply to the digital system 100 illustrated in FIG. 8. Furthermore, the digital cancellation system 100 is ideally suited for applications where the CAS detector 27 or FSK demodulator 28 will be simulated (i.e., performed mathematically) by the central processing unit 190.

At a high level, the mathematical cancellation method consists of: 1) applying the complex signal source 15 as a calibration signal; 2) sampling both tapped signals 104 and 105 from the center of the Wheatstone bridge; 3) utilizing phase shifter 101 and gain control 103 determining the best phase shift and gain factors that match the mirror signal 105 to the reference signal 104; 4) removing the complex signal source and applying the best phase shift and gain factors to the sampled mirror signal 105; and 5) beginning steadystate operation where the reference signal 104 and the manipulated mirror signal are subtracted from each other to produce a resultant signal in digital representation that can be either passed to mathematical algorithms that perform tone signal detection and FSK demodulation, or to a digital-to-analog converter 102 that creates an analog resultant signal.

Similar to the analog system 10, the mathematical cancellation method requires a period of calibration to adapt the system 100. The calibration method begins by applying the complex signal source 15 to the line. The complex signal source 15 can be a simple signal source, such as a sine wave, where the central processing unit 190 can only turn the source on or off. However, the complex signal source 15 can also be a signal that is controlled both in amplitude and phase by the central processing unit 190. Such a signal can be a pseudo-noise sequence mathematically generated by a series of shift registers. In this case, the complex signal source 15 is likely to be a digital-to-analog converter that is fed digital words by the central processing unit 190 for signal generation by direct digital synthesis. This method allows more accurate calibration of the cancellation system 100.

The mathematical cancellation system 100 incorporates an analog to digital (A/D) converter 102 to sample both signals 104 and 105 tapped from the center of the Wheatstone bridge. The sampled versions of these tapped signals will be manipulated by the central processing unit 190 to produce a resultant signal where the near-end speech signal is cancelled. At the start of the calibration process, it is unlikely that the phase and amplitude of the complex signal present on each of the tapped signals will be identical. During the calibration period, the central processing unit 190 attempts to determine the optimal phase shift and amplitude factors. It manipulates of one these signals and takes feedback measurements of a resultant signal with the goal of minimizing the resultant signal. The signal that is manipulated is a sampled version of the mirror signal 105 tapped from the Wheatstone bridge. A sampled version of the tapped signal 104 from the other leg of the Wheatstone bridge will act as the reference signal.

After the central processing unit 190 connects and activates the complex signal source 15, the system adaptation process begins with the sampling of both tapped signals 104 and 105 using the analog to digital converter 102. The signals are sampled at a rate preferably 20 times or more than the highest frequency in the complex signal. The mirror signal 105 is likely to be out of phase, time shifted and at a different amplitude than the reference signal 104. The first step in calibrating the mathematical canceller is to determine the difference in phase and time shift between the tapped signals 104 and 105. This is achieved by first collecting and storing three or more periods [3/(1000T) ms] worth of the tapped signals. Preferably, the samples of each signal are collected simultaneously. The total amount of signal that needs to sampled and stored is about twice the expected time shift between tapped signals.

Once collected in memory or storage 106, the central processing unit 190 then follows a systematic algorithm to determine the optimal time shift needed in the sampled mirror signal 105. Several search algorithms can be applied. The simplest approach uses a time shift range with a fixed, incremental step. The central processing unit 190 makes a copy of the sampled mirror signal 105 and, starting at the lower end of the time shift range, applies the time shift to the mirror signal 105. The time shift can be both positive and negative to account for signal delay, capacitive phase delay and inductive phase advance. Time shifting can be implemented in several ways, but the simplest method is to shift all points by the fixed increment of one sample.

Figure 9:
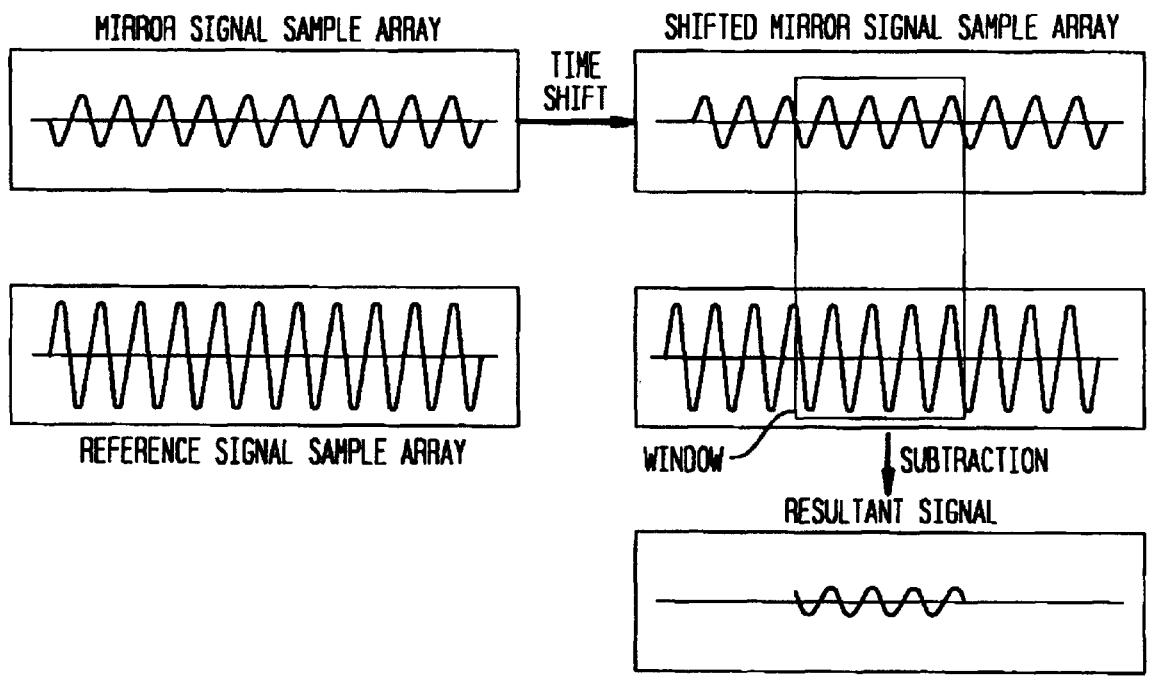
FIG. 9 depicts exemplary plots of time shifting and windowing in accordance with an aspect of my invention.

After the time shift has been applied as illustrated in FIG. 9, the modified mirror signal 105 is subtracted from the sampled reference signal 104. The subtraction process occurs over a window that falls within the duration of the sampled, tapped signals. A smaller window is used so that as the shifting occurs in the mirror signal 105, sufficient sample points exist to perform the subtraction calculation. Preferably, the window is established at the center portion of the sampled reference signal 104. The window size is preferably one-fourth of the sampled, reference signal length to permit calculation for both signal delay and signal advance situations.

The resultant digital signal after the subtraction process is then processed by a signal level estimation algorithm 107, such as one that produces a mean square estimate of the signal power. The signal level estimator produces a single power estimate that is used as a figure of merit to rate the time shift factor. The signal power estimate is compared to a stored value, called the Lowest_power_estimate. Initially, the Lowest_power_estimate variable is set to its highest digital value. If the measured signal power estimate is lower than the Lowest_power_estimate value, the Lowest_power_estimate value is updated to the new measured signal power estimate and the time shift factor that was applied to the mirror signal is stored in the variable called Best_time_shift_estimate. The algorithm now loops and proceeds to the next step in the time shift range. It repeats the application of time shifting to a copy of the sampled mirror signal 105, the subtraction and signal power estimation processes and as wells as the comparison to the stored signal power estimate. This process is repeated until the entire time shift range is covered.

More advanced algorithms can be used that track the gradient change in the signal power estimates. If the gradient is getting larger, divergence is occurring and there may be no need to continue further with the process. In these cases, such an algorithm may help the process converge in less time.

Once the best time shift has been determined, the stored copy of the sampled mirror signal is manipulated to exhibit the Best_time_shift_estimate. The Lowest_power_ estimate is again set to its highest digital value. The next step in the calibration process is to find the gain or attenuation factor that results in the lowest complex signal return.

Figure 10:
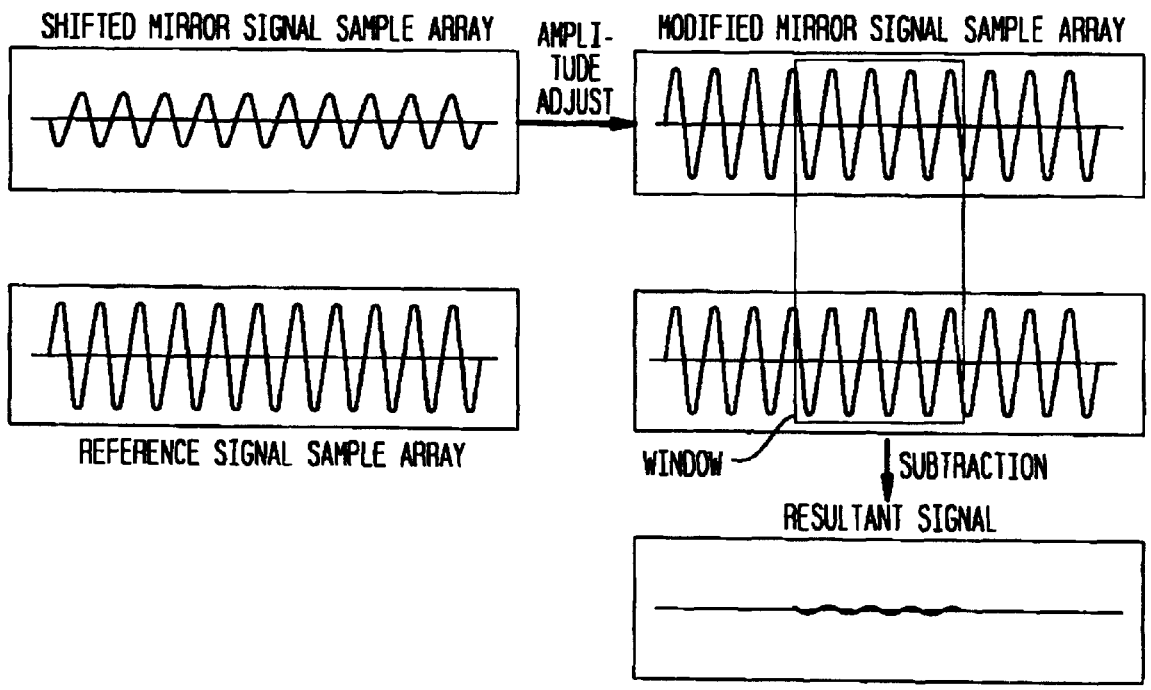
FIG. 10 depicts exemplary plots of time shifting and amplitude adjusting in accordance with an aspect of my invention.

Once again, several search algorithms can be applied. The simplest approach uses an amplitude range with a fixed, incremental step preferably equal to a one step of the analog-to-digital converter. In this approach, the time shifted mirror signal is multiplied by the amplitude factor and the central processing unit 19 proceeds similarly as previously described to subtract the shifted, amplitude-adjusted mirror signal from the sampled reference signal 104. The procedure is illustrated in FIG. 10. Signal power estimation is performed and the search for the lowest power estimate proceeds. However, instead of updating the variable Best_ time_shift_estimate when the measured signal power estimate is lower than the Lowest_power_estimate, the variable Best_amplitude_estimate stores the factor used to multiply the shifted, mirror signal. The algorithm then loops and proceeds to the next step in the amplitude range. This process is repeated until the entire amplitude range is covered. Similarly, more advanced algorithms can be used to track gradient changes in the signal power estimates for faster convergence of the best amplitude factor.

The amplitude range can be determined by comparing the peak levels of the sampled reference signal and the mirror or shifted mirror signals. The amplitude factor can be estimated by taking the ratio of the reference signal peak amplitude to the shifted mirror signal peak amplitude (RSP/SMSP). If the reference signal peak amplitude is higher than the shifted mirror signal peak amplitude, additional signal gain is needed for good cancellation. However, for added reliability, the amplitude range should be set at 2*RSP/SMSP at the upper end and SMSP/(RSP) at the lower end. If the shifted mirror signal peak amplitude is greater than the reference signal peak amplitude, the opposite condition exists and attenuation is desired for good cancellation. In this case, the amplitude range should be set at RSP/(2*SMSP) at the lower end and SMSP/RSP at the upper end. Alternatively, the amplitude range can be a fixed range, such as 1/128 to 128.

Figure 11:
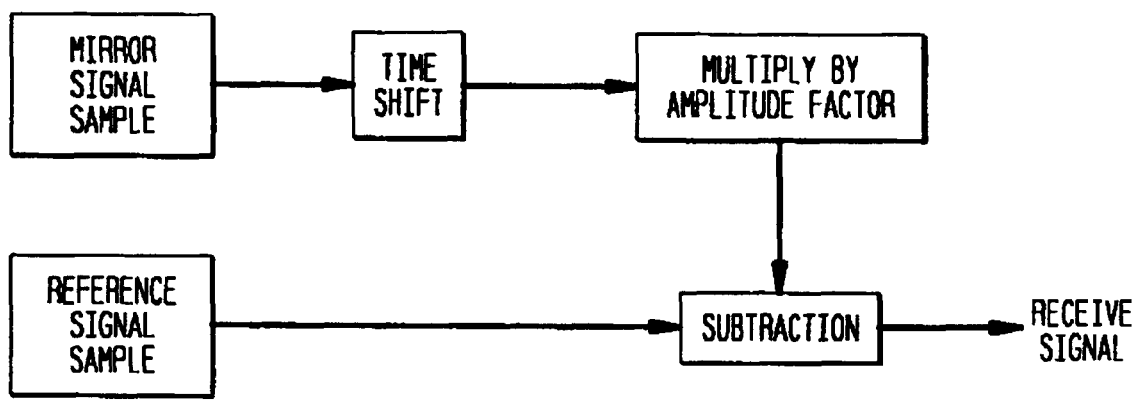
FIG. 11 depicts the method of obtaining a cancelled signal in accordance with the embodiment depicted in FIG. 11.

Once the time shift and amplitude factors are known, the central processing unit 190 exits the calibration routine by turning off the complex signal source 15 and disconnecting it from the telephone line. The central processing unit 190 then establishes the amplitude factor as the Best_amplitude_estimate and the time shift factor as the Best_time_shift_estimate. It then starts continuously sampling the tapped signals 104 and 105 and applies the time shift and amplitude factors to the sampled version of the mirror signal in real time. Also in real time, the central processing unit 190 subtracts the shifted, amplitude adjusted mirror signal from the reference signal to produce the resultant signal. The resultant signal is the sampled equivalent of the Receive Signal 31 in FIG. 6. The procedure is illustrated in FIG. 11. Near-end speech is cancelled on this signal. It can than be passed to a digital implementation of a tone signal detector 27 or FSK demodulator 28 or passed to a digital-to-analog converter for analog reconstruction as previously described.

Figure 12:
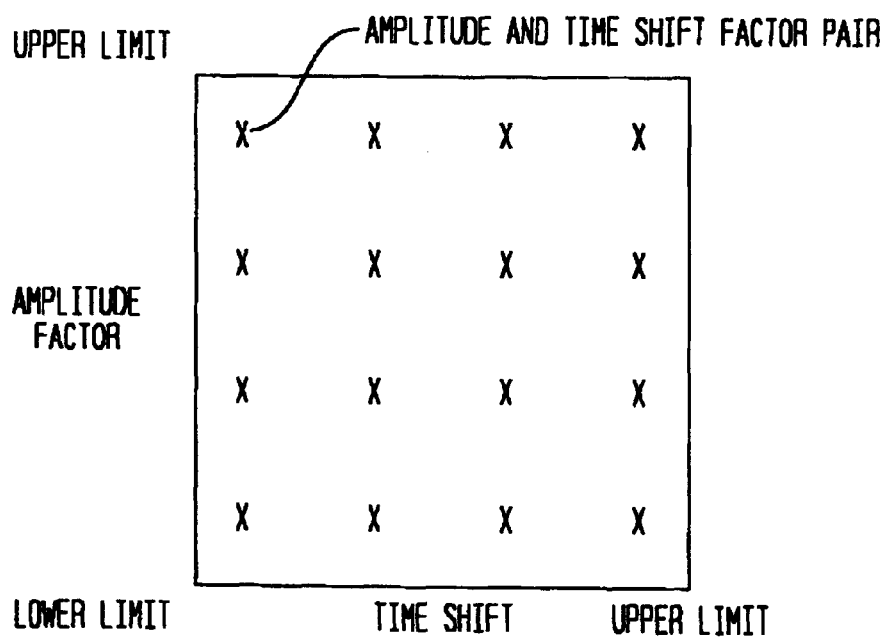
FIG. 12 depicts an exemplary time shift and amplitude grid in accordance with an aspect of my invention.

The above algorithm attempts to find the time shift and amplitude factors that produce a resultant signal with the lowest signal power estimate. In most cases, this algorithm should suffice. However, depending upon the complex signal used, it is possible for the above algorithm to find the best time shift and the best amplitude factor that when combined only result in a local minima power estimate condition for the resultant signal. In such cases, a brute force method of systematically processing a two dimensional grid (consisting of amplitude factors versus time shift factors) is recommended. Instead of attempting to identify these factors independently of one another, a trial and error effort is made by trying each point in the grid as illustrated in FIG. 12. The combination that produces the lowest signal power estimate is the pair of factors to be used during steady-state operation.

Figure 13:
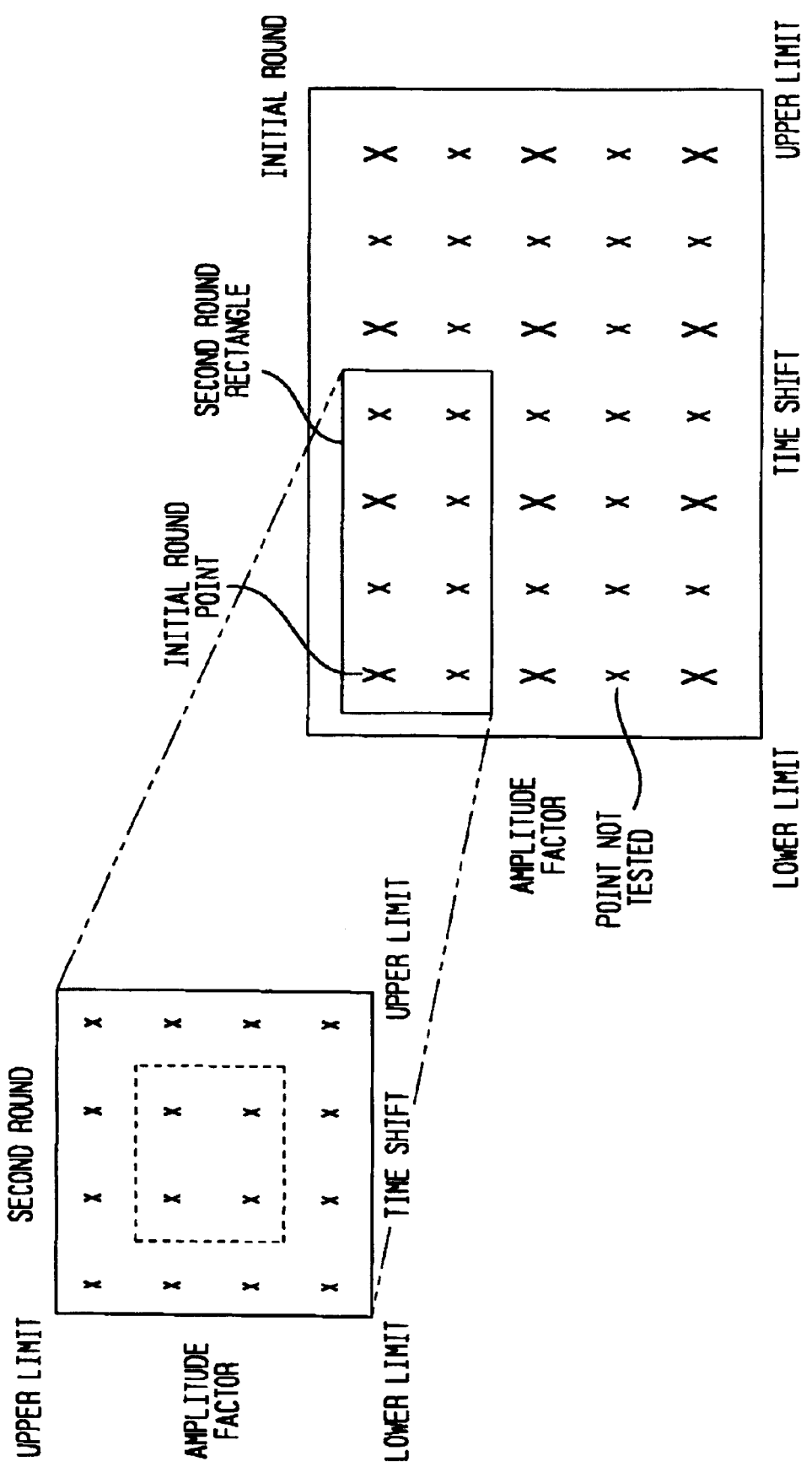
FIG. 13 depicts an exemplary time shift and amplitude grid in accordance with an aspect of my invention.

To make this algorithm converge faster, every second or third point in the grid can be initially evaluated instead of evaluating every point as illustrated in FIG. 13. However, the signal power estimate for each point must be stored. After the initial round is complete, the central processing unit 19 searches the grid for a rectangle whose corner points have the lowest resultant signal power estimates. The signal power estimates of the 4 corner points are averaged and stored in a local variable. The central processing unit 19 then uses the coordinates of those four points to determine the new amplitude and time shift ranges. It then focuses in on that space and iteratively repeats the process as many times as desired. At the point where the difference between the new, average 4 point power estimate is less than 2% different from the previous average 4 point power estimate, the process is terminated and the switch to steady-state operation can begin.

The above description has been presented only to illustrate and describe the invention. It is not intended to be exhaustive or to limit the invention to any precise form disclosed. Many modifications and variations are possible in light of the above teaching. The embodiments were chosen and described in order to best explain the principles of the invention and its practical application to enable others skilled in the art to best utilize the invention on various embodiments and with various modifications as are suited to the particular use contemplated.

I claim:

1. A combination for near end speech cancellation connected to the tip and ring interface leads of a loop to which is attached office equipment, said combination comprising:
   a first impedance element in series with one of the tip and ring interface leads, said first impedance element and an impedance of the loop and office equipment connected to the tip and ring leads forming one half of a Wheatstone bridge having a center;
   network means and a scalable impedance element connected in series with said network means and forming the other half of the Wheatstone bridge, an impedance of the network means matching the impedance of the loop and office equipment connected to the tip and ring leads multiplied by a factor of K and the scalable impedance matching the impedance of the first impedance element, also multiplied by the factor of K where K is greater than 1;
   a detector connected across the center of the Wheatstone bridge, said detector being connected to the connection point between the first impedance element and the impedance of the loop and office equipment in said one half of the Wheatstone bridge and the connection point between said network means and the scalable impedance element of said other half of the Wheatstone bridge; and
   a system controller for altering the impedance of said scalable impedance element to cause said scalable impedance element to mirror the impedance of said first impedance element by the factor of K.

2. The combination of claim 1 wherein said network means comprises a plurality of networks of different impedances and wherein the system controller is further for selecting the one of said networks which mirrors the impedance of the loop and office equipment.

3. The combination of claim 2 wherein said first impedance element is a resistor of known small resistance value and said scalable impedance element comprises a series-parallel combination of resistors including a switchable resistance ladder.

4. The combination of claim 1 wherein said first impedance element is a resistor of known small resistance value and said scalable impedance element comprises a sensing resistor in parallel with a fixed resistor and an adjustable resistor ladder, said system controller causing the opening and closing of taps on said resistor ladder to cause said scalable impedance element to mirror the impedance of said resistor of known small resistance value by the factor of K.

5. The combination of claim 4 wherein said network means comprises a plurality of networks of different impedances and switching means for connecting one of said networks in the Wheatstone bridge, said combination further comprising means for determining which of said networks mirrors the impedance of the loop and the office equipment by the factor of K, said system controller being responsive to said determining means for operating the switching means for said one or more of said networks.

6. The combination of claim 4 wherein said network means comprises a plurality of networks of different impedances, each permanently connected to the one lead of the tip and ring interface and its own scalable impedance element, thus forming multiple halves of the Wheatstone bridge.

7. The combination of claim 6 wherein detectors are connected between the first impedance element and the impedance of the loop and office equipment in one half of the Wheatstone bridge and singularly connected to the connection point between each network and its scalable impedance element for each half of the Wheatstone bridge.

8. The combination of claim 7 further comprising means for determining which of said networks mirrors the impedance of the loop and the office equipment by the factor of K, said system controller being responsive to said determining means for operating a switching means for selecting a detector output by operating the switching means.

9. The combination of claim 1 wherein said first impedance element is a first transistor or transistor combination and said scalable impedance element is a second transistor or transistor combination, said combination further comprising means responsive to said system controller for causing a current flow through said second transistor to mirror a current flow through said first transistor by a factor of 1/K.

10. The combination of claim 9 wherein said network means comprises a plurality of networks of different impedances and switching means for connecting one of said networks in the Wheatstone bridge, said combination further comprising means for determining which of said networks mirrors the impedance of the loop and the office equipment by the factor of K, said system controller being responsive to said determining means for operating the switching means for said one of said networks.

11. The combination of claim 1 wherein said detector is a differential amplifier the output of which is attenuated or cancelled near end speech along with tone signals emanating from the loop, the combination further comprising one or more tone signal detectors or data receivers that receive the output of the differential amplifier.

12. A combination for near end speech cancellation connected to the tip and ring interface leads of a loop to which is attached office equipment, said combination comprising:
a first impedance element in series with one of the tip and ring interface leads, said first impedance element and an impedance of the loop and office equipment connected to the tip and ring leads forming one half of a Wheatstone bridge having a center;
network means and a scalable impedance element connected in series with said network means and forming the other half of the Wheatstone bridge, an impedance of the network means matching the impedance of the loop and office equipment connected to the tip and ring leads multiplied by a factor of K and the scalable impedance matching the impedance of the first impedance element, also multiplied by the factor of K where K is greater than 1; and
a detector connected across the center of the Wheatstone bridge, said detector being connected to the connection point between the first impedance element and the impedance of the loop and office equipment in said one half of the Wheatstone bridge and the connection point between said network means and the scalable impedance element of said other half of the Wheatstone bridge;
wherein said first impedance element is a first transistor or transistor combination and said scalable impedance element is a second transistor or transistor combination and further comprising means for causing a current flow through said second transistor or transistor combination to mirror a current flow through said first transistor or transistor combination by a factor of 1/K.

13. An apparatus for canceling near end speech or signals incident on a tip and ring tone detector, said apparatus being connected to a primary tip and ring interface having leads from, a loop and to a secondary tip and ring interface, said apparatus comprising:
a sensor connected in series with either lead of the primary tip and ring interface, said sensor and the loop forming one half of a Wheatstone bridge having first and second center taps;
a variable mirror circuit having an impedance that is K times larger than the impedance of said sensor where K is greater than 1;
a balance network connected to the secondary tip and ring, said balance network being selectable to obtain the mirror circuit impedance that best matches the impedance encountered on the primary tip and ring interface and being connected to said variable mirror circuit such that said variable mirror circuit and said balance network form the other half of said Wheatstone bridge; and means for detecting cancellation of near speech connected across said Wheatstone bridge center taps;
wherein said sensor comprises a sensing resistor having a small resistance value; and
wherein said mirror circuit comprises a first resistor having impedance slightly larger than said sensing resistor in parallel with a switchable resistor ladder, said resistor ladder being in series with a second resistor having an impedance that offsets the combined parallel resistance of said second resistor and said resistor ladder.

14. The apparatus in accordance with claim 13 wherein said balance network comprises a plurality of networks of different impedances.

15. The apparatus in accordance with claim 14 wherein said balance networks are permanently connected to the one lead of the tip and ring interface and its own scalable impedance element.

16. The apparatus in accordance with claim 14 further comprising switching means for connecting one or more of said networks in the Wheatstone bridge.

17. The apparatus in accordance with claim 14 wherein said detector means comprises a differential amplifier having an output, a first input, and a second input, said first input being capacitively coupled to the lead on the primary tip and ring interface that is connected to said sensing resistor, said second input being capacitively coupled to a common node between said balance network and said mirror circuit, and said output being coupled to tone detectors or data receivers so as to supply the tone detectors or data receivers attenuated or cancelled near end speech along with tone signals emanating from the loop.

18. The apparatus in accordance with claim 17 further comprising a system controller having buffers and means for monitoring said sensing resistor, tuning said resistor ladder to match the sensing resistor by the factor K, attaching said balance networks to the secondary tip and ring interface, setting a gain in said differential amplifier, and deciding which of said balance networks best matches the impedance encountered on the primary tip and ring interface.

19. The apparatus in accordance with claim 18 further comprising a system controller having buffers and means for monitoring said sensing resistor, setting a gain in each of said detectors, and deciding which output of the set of detectors produces the best cancellation of near end signals, thereby selecting the half circuit of the Wheatstone bridge with said balance network that best matches the impedance encountered on the primary tip and ring interface.

20. The apparatus in accordance with claim 19 further comprising a voltage line sense means connected across the primary tip and ring interface to determine a state of the line.

21. The apparatus in accordance with claim 20 further comprising means for removing dial tone by the office equipment during a calibration process.

22. The apparatus in accordance with claim 14 wherein said detector means comprises a multitude of detectors each having an output, a first input, and a second input, and wherein said first input of each detector is capacitively coupled to the lead on the primary tip and ring interface that is connected to said sensing resistor, said second input of the detectors being individually capacitively coupled to a common node between said balance network and its said mirror circuit, one detector per each half circuit of the Wheatstone bridge of which there are several, and wherein said detector outputs are selectively coupled to tone detectors, data receivers or apparatus desiring attenuation or cancellation of near end speech including tone signals emanating from the loop.

23. The apparatus in accordance with claim 13 wherein said detector means comprises:
   an analog to digital converter coupled to the Wheatstone bridge first and second center taps; and
   a processing unit having means for manipulating digital words and a memory, said processing unit being coupled to said analog to digital converter.

24. The apparatus in accordance with claim 23 further comprising a complex signal source under the control of said processing unit.

25. The apparatus in accordance with claim 24 where said complex signal source comprises a digital to analog converter that is fed digital words by said processing unit.

26. The apparatus in accordance with claim 24 wherein said processing unit digital word manipulation means further comprises means for sampling an analog signal at a rate of approximately twenty or more times than a highest frequency of a complex signal produced by said complex signal source.

27. The apparatus in accordance with claim 26 wherein said processing unit digital word manipulation means further comprises means for determining the difference in phase and time shift between signals appearing at the first and second center taps and means for optimizing the time shift at the second center tap.

28. The apparatus in accordance with claim 26 wherein said processing unit digital word manipulation means further comprises means for determining the difference in amplitude between signals appearing at the first and second center taps and means for optimizing the amplitude at the second center tap.

29. The apparatus in accordance with claim 26 wherein said processing unit digital word manipulation means further comprises means for subtracting the signal appearing at the first tap and an optimized signal extracted from the second center tap.

30. An apparatus for near end speech cancellation for tone signal detectors connected to tip and ring interface leads from a loop, said apparatus comprising:
   first impedance means in series with one of the tip and ring interface leads and forming with the loop and office equipment one half of a Wheatstone bridge having first and second center taps;
   second variable impedance means having a mirror impedance that is K times larger than an impedance of said first impedance means, where K is greater than 1, and in series with a known network means, said second variable impedance means and said known network means forming the second half of the Wheatstone bridge;
   processor means for determining the mirror impedance of said second variable impedance means that best matches the impedance of said first impedance means by the factor of K; and
   means connected across the center taps of the Wheatstone bridge for canceling near end signals.

31. The apparatus in accordance with claim 30 wherein said processor means include a line buffer, an energy buffer, and a network element identity buffer.

32. The apparatus in accordance with claim 30 wherein said processor means includes a phase shifter circuit, a gain control circuit, memory, and a signal level estimating circuit or functionally equivalent digital algorithms.

33. A method for near end speech cancellation for tone signal detectors connected to tip and ring leads from a loop to which is attached office equipment, said method comprising the steps of:
   connecting a first impedance element in series with one of the tip and ring interface leads, the first impedance element and an impedance of the loop and office equipment forming one half of a Wheatstone bridge having first and second center taps;
   coupling a variable impedance element in series with network means to form the other half of the Wheatstone bridge so that the variable impedance and network means matches the impedance of the first impedance element and the impedance of the loop respectively, each by a factor of K where K is greater than 1; and
   detecting the signal across the Wheatstone bridge at the connection point between the first impedance element and the impedance of the loop in the first half of the Wheatstone bridge and the connection point between the network means and the variable impedance element of the other half of the Wheatstone bridge;
   wherein said connecting step comprises the substeps of:
      monitoring a voltage across the tip and ring leads; and
      indicating to a system controller a status of the tip and ring leads of the loop based on said monitored voltage.

34. The method in accordance with claim 33 wherein said coupling step comprises the substeps of:
   applying a DC line termination and calibration signal, responsive to said indicated status, across the tip and ring leads of the loop;
   providing an analog or digital output to the system controller that is proportional to energy at the tone signal detectors;
   selectively adjusting, responsive to said provided analog or digital output at the system controller, the variable impedance so that the variable impedance is approximately K times the first impedance;
   selectively choosing by the system controller the network means that minimizes the near end speech energy; and
   setting a differential amplifier output based on the said attached network means.

35. The method in accordance with claim 33 wherein said coupling step comprises the substeps of:
   applying a DC line termination and calibration signal, responsive to said indicated status, across the tip and ring leads of the loop;
   sampling, responsive to the calibration signal, the first and second center taps of the Wheatstone bridge to obtain a reference signal;
   using phase shift and gain control means to match the reference signal to the signal appearing across the variable impedance to produce matched phase shift and gain control factors;

applying the matched phase shift and gain control factors to the signal appearing across the variable impedance to produce a manipulated signal; and subtracting the reference signal from the manipulated signal to produce a resultant digital signal wherein near end signals have been attenuated or cancelled.

36. An apparatus for canceling near end speech, said apparatus comprising:

primary tip and ring interface leads for connecting a loop impedance;

secondary tip and ring interface leads for connecting secondary equipment;

a sensor connected in series with either lead of the primary tip and ring interface leads;

a controlled circuit that is the mirror of the sensor and is controllable to have an impedance that is K times larger than the impedance of the sensor where K is greater than 1;

a controlled balance network for obtaining an impedance that is K times larger than the loop impedance to be encountered on the primary tip and ring interface, and wherein the controlled balance network and the controlled circuit are connected in series across the primary tip and ring interface leads and across the secondary tip and ring interface leads;

a first center tap between the sensor and the primary tip and ring interface lead to which the sensor is connected in series;

a second center tap at the connection of the controlled balance network and the controlled circuit; and means for detecting cancellation of near end speech wherein the detecting means is connected across the first and second center taps.

* * * * *

UNITED STATES PATENT AND TRADEMARK OFFICE
CERTIFICATE OF CORRECTION

PATENT NO.    : 6,628,779 B1
DATED         : September 30, 2003
INVENTOR(S)   : Stanley Pietrowicz It is certified that error appears in the above-identified patent and that said Letters Patent is hereby corrected as shown below:

Column 10,
Line 33, change "primary" to -- secondary --;
Line 34, change "29" to -- 30 --.

Column 13,
Line 4, change "calibration" to -- complex signal --.

Column 18,
Line 23, change "14" to -- 24 --;
Line 37, change "10" to -- 8 --.

Column 24,
Line 29, change "second" to -- first --;
Lines 36-37, change "sealable impedance element" to -- variable mirror circuit --.
Lines 53-54, change "and means for monitoring said sensing resistor" to -- , said system controller performing the functions of --
Line 60, change "18" to -- 22 --
Line 62, insert after "resistor," -- said system controller performing the functions of --

Column 25,
Lines 33-34, change "processing unit digital word manipulation means further comprises means for sampling" to -- analog to digital converter samples --.

Column 26,
Line 28, change "loop respectively" to read as -- loop and office equipment respectively --.

Signed and Sealed this

Twentieth Day of July, 2004

JON W. DUDAS
*Acting Director of the United States Patent and Trademark Office*